United States Patent
Kozakaya et al.

(10) Patent No.: US 11,418,707 B2
(45) Date of Patent: Aug. 16, 2022

(54) ELECTRONIC DEVICE AND NOTIFICATION METHOD

(71) Applicant: KABUSHIKI KAISHA TOSHIBA, Tokyo (JP)

(72) Inventors: Tatsuo Kozakaya, Kanagawa (JP); Nao Mishima, Tokyo (JP); Akihisa Moriya, Tokyo (JP); Jun Yamaguchi, Kanagawa (JP); Tomoya Tsuruyama, Kanagawa (JP); Takayuki Sasaki, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 16/292,438

(22) Filed: Mar. 5, 2019

(65) Prior Publication Data

US 2020/0092464 A1   Mar. 19, 2020

(30) Foreign Application Priority Data

Sep. 18, 2018   (JP) .............................. JP2018-174037

(51) Int. Cl.
*G06T 7/55* (2017.01)
*H04N 5/232* (2006.01)
(Continued)

(52) U.S. Cl.
CPC .......... *H04N 5/23222* (2013.01); *G06T 7/13* (2017.01); *G06T 7/55* (2017.01); *G06T 7/70* (2017.01); *H04N 9/0455* (2018.08); *H04N 9/646* (2013.01); *G06T 2207/10024* (2013.01); *G06T 2207/10028* (2013.01); *G06V 20/10* (2022.01)

(58) Field of Classification Search
CPC .... H04N 5/23222; H04N 9/0455; G06T 7/55; G06T 7/13; G06T 2207/10024; G06K 9/00664

See application file for complete search history.

(56) References Cited

U.S. PATENT DOCUMENTS

2006/0153450 A1* 7/2006 Woodfill ............ G06K 9/00973
382/173
2013/0342659 A1* 12/2013 Onishi ...................... G06T 7/70
348/47

(Continued)

FOREIGN PATENT DOCUMENTS

JP    2016-102733 A    6/2016
JP    2018-84571 A    5/2018

*Primary Examiner* — Dave Czekaj
*Assistant Examiner* — Berteau Joisil
(74) *Attorney, Agent, or Firm* — Finnegan, Henderson, Farabow, Garrett & Dunner L.L.P.

(57) ABSTRACT

According to one embodiment, an electronic device includes one or more processors. The one or more processors obtain an image captured by a camera with a filter having a first area transmitting light of a first wavelength range and a second area transmitting light of a second wavelength range. The image includes a first color-component image based on the light of the first wavelength range and a second color-component image based on the light of the second wavelength range. The one or more processors notify a user of an effective area for calculation of depth information based on a bias of color information in the first color-component image and the second color-component image.

20 Claims, 20 Drawing Sheets

(51) Int. Cl.
   *H04N 9/04*      (2006.01)
   *G06T 7/13*      (2017.01)
   *H04N 9/64*      (2006.01)
   *G06T 7/70*      (2017.01)
   *G06V 20/10*     (2022.01)

(56) References Cited

U.S. PATENT DOCUMENTS

| | | | |
|---|---|---|---|
| 2014/0289323 A1* | 9/2014 | Kutaragi | H04L 67/42 |
| | | | 709/203 |
| 2016/0096487 A1* | 4/2016 | Konevsky | H04N 5/2254 |
| | | | 348/148 |
| 2016/0154152 A1* | 6/2016 | Moriuchi | G02B 5/201 |
| | | | 348/374 |
| 2016/0173856 A1* | 6/2016 | Naito | G06T 7/571 |
| | | | 348/46 |
| 2016/0364624 A1* | 12/2016 | Kim | G06K 9/3241 |
| 2018/0137629 A1 | 5/2018 | Mishma et al. | |
| 2019/0005666 A1* | 1/2019 | Nakagawa | G06T 7/00 |

* cited by examiner

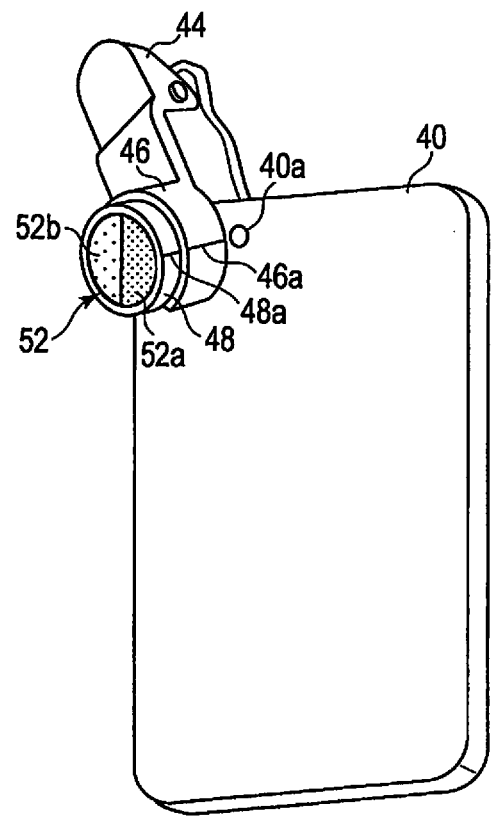
F I G. 6A
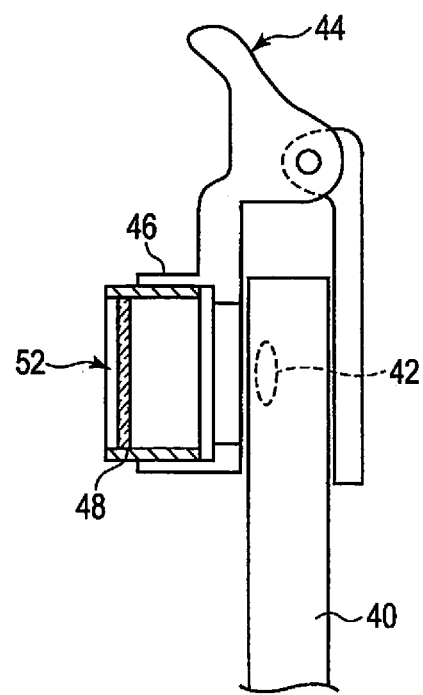
F I G. 6B

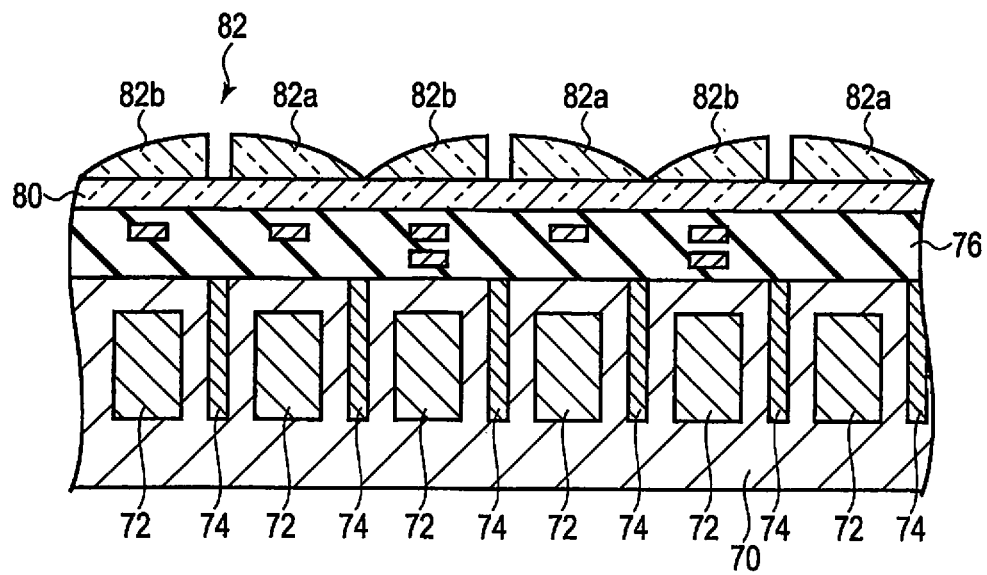
F I G. 8
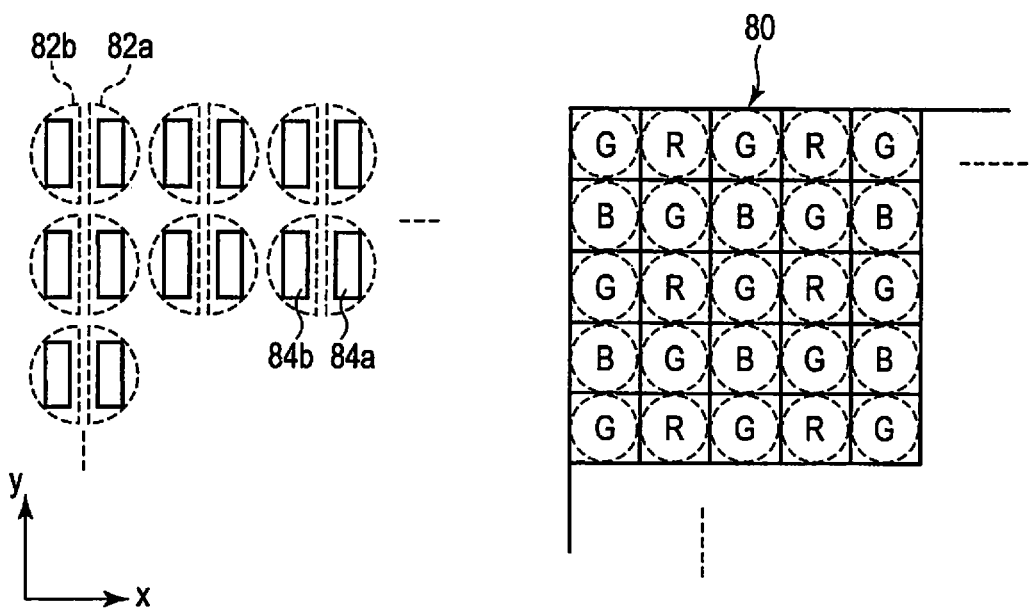
F I G. 9A      F I G. 9B

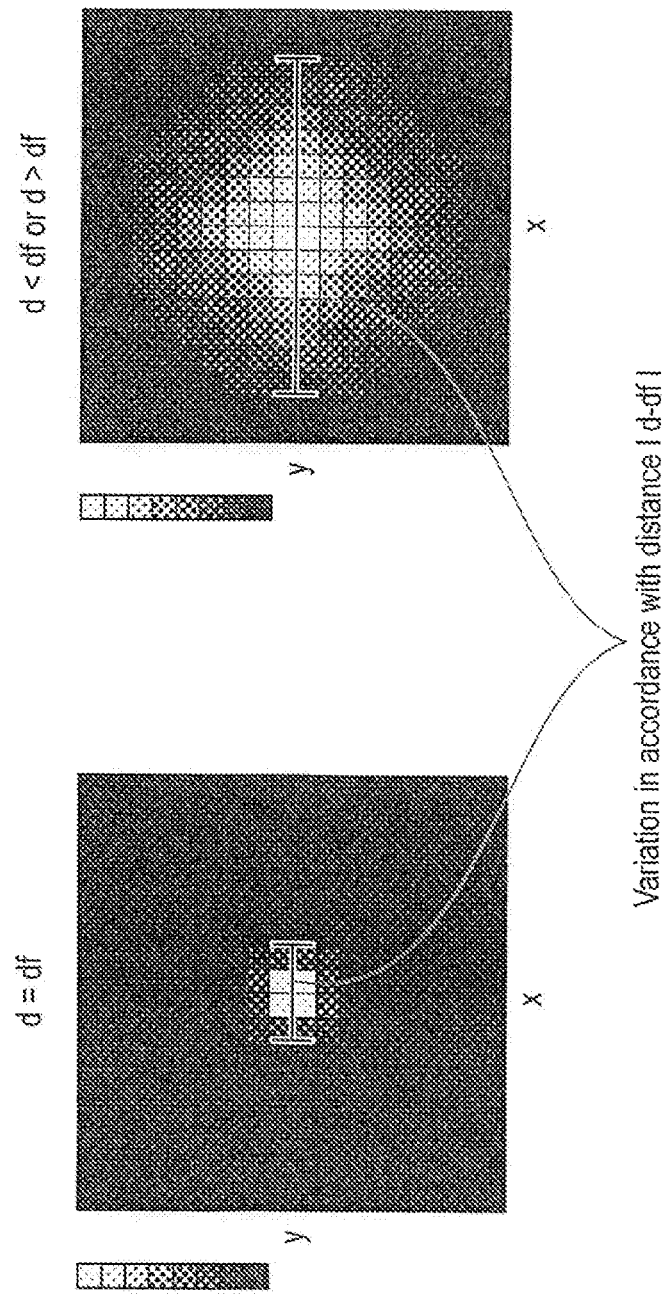
F I G. 12

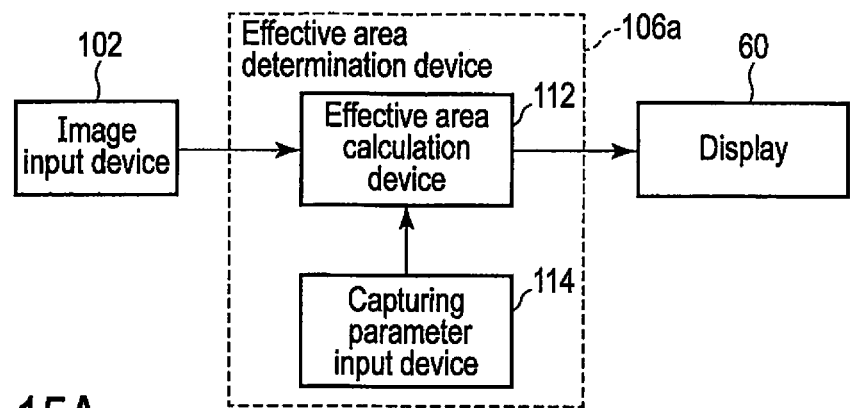
F I G. 15A
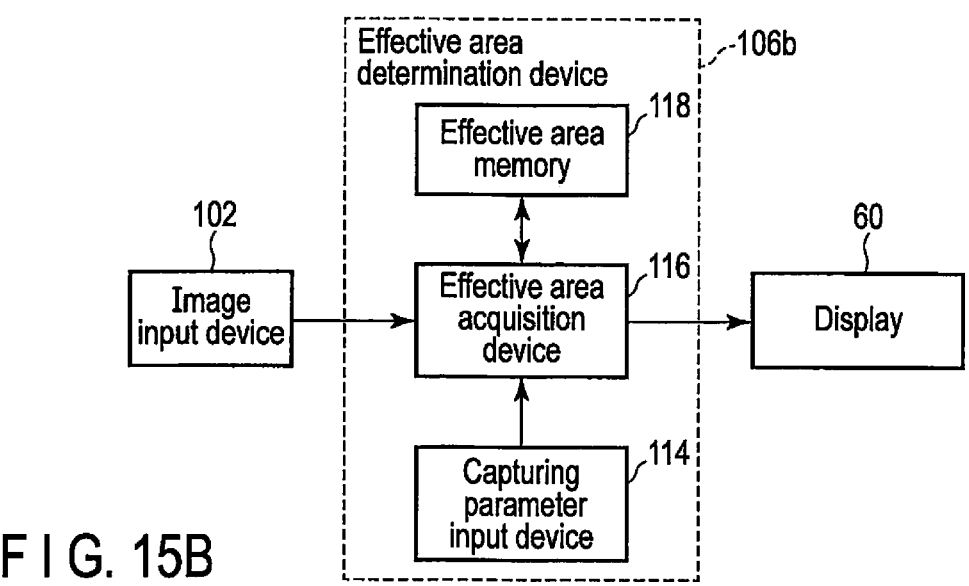
F I G. 15B
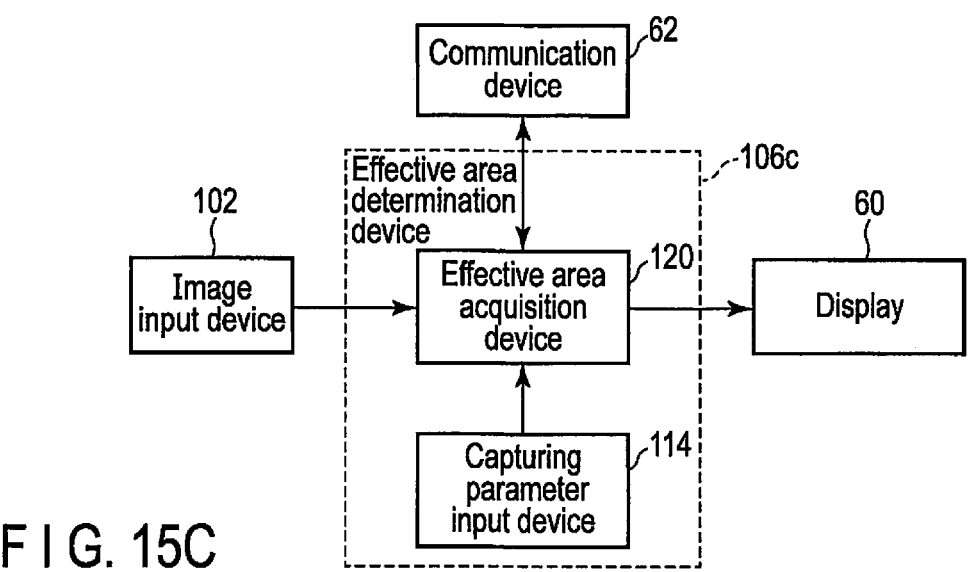
F I G. 15C

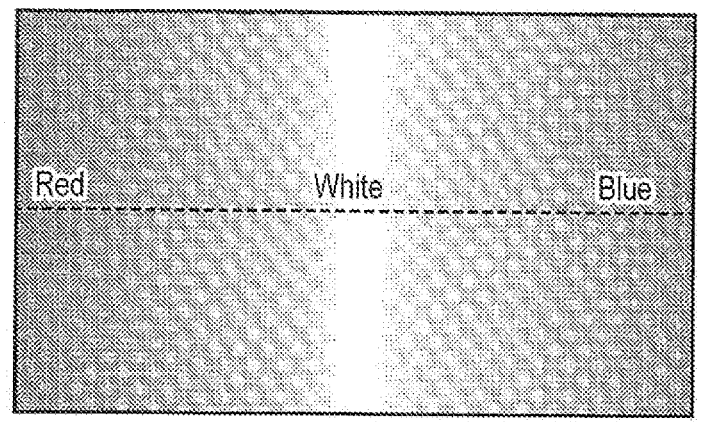
F I G. 16A
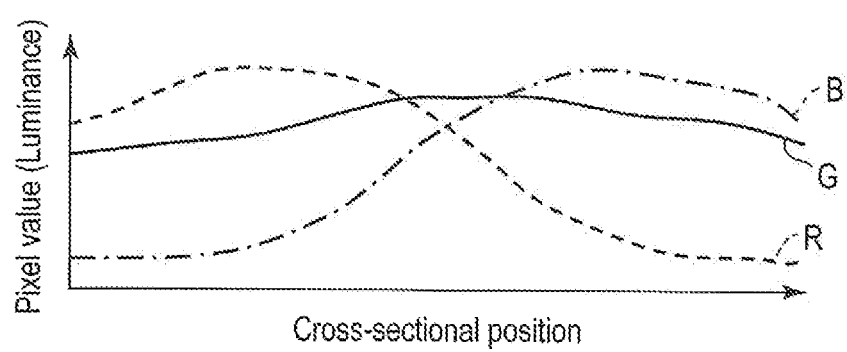
F I G. 16B

| Capturing parameter | | | | Depth request level | Effective area | |
|---|---|---|---|---|---|---|
| F value | Focal length | Distance between filter and lens aperture | Size of image sensor ... | | Left end | Right end |
| 2.4 | 26mm | 6.5mm | 1/2.3 ... | High | -10 | +10 |
| | | | | Low | -20 | +20 |
| 2.8 | 30mm | 6.5mm | 1/1.5 ... | High | | |
| | | | | Low | | |

FIG. 17

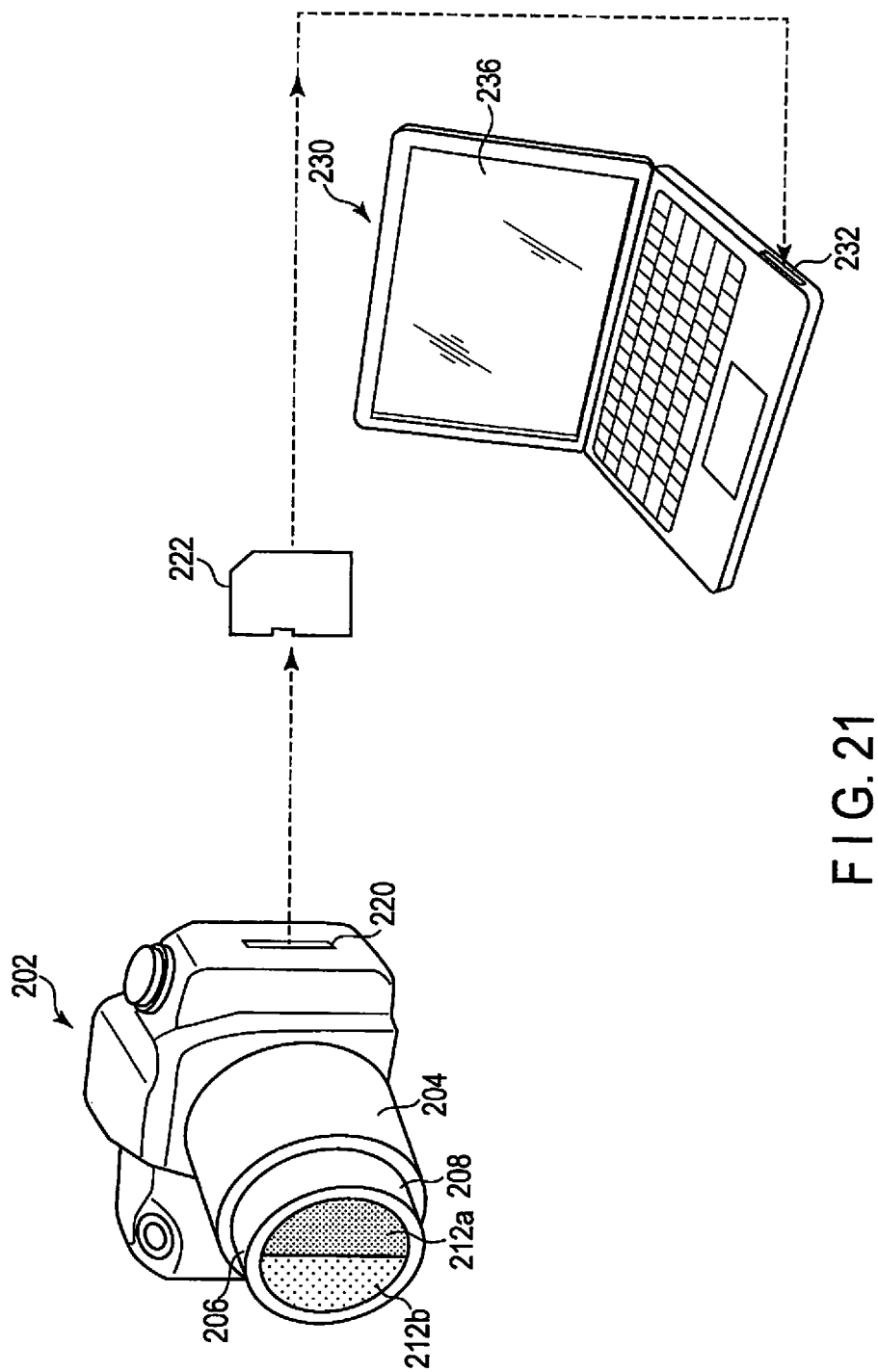
F I G. 21

ELECTRONIC DEVICE AND NOTIFICATION METHOD

CROSS-REFERENCE TO RELATED APPLICATIONS

This application is based upon and claims the benefit of priority from Japanese Patent Application No. 2018-174037, filed Sep. 18, 2018, the entire contents of which are incorporated herein by reference.

FIELD

Embodiments described herein relate generally to an electronic device and a notification method.

BACKGROUND

A method of using a stereo camera as a method of acquiring a captured image and depth information simultaneously has been known. However, a device for realizing such a method becomes large since two cameras are necessary and it is necessary to lengthen an interval between the two cameras in order to secure parallax. Thus, there is a demand for a method of obtaining depth information with one camera. As one example thereof, proposed is a technique of obtaining depth information based on a shape difference of a blur function of an image for each of a plurality of color components captured by an image sensor. An image is captured using a filter formed of at least two areas passing different color components in order to cause the blur for each color component in the image. A mechanism configured to obtain depth information using a filter having different transmission characteristics of color components is called a color aperture.

It is preferable to arrange the filter having the different transmission characteristics of color components in a lens aperture in order to cause the blur for each color component in the image at any portion, such as the center and periphery of the image. For this purpose, however, it is necessary to customize a camera lens or to modify a commercially available camera lens. Thus, it is not easy to obtain the depth information with one camera.

BRIEF DESCRIPTION OF THE DRAWINGS

FIGS. 6A and 6B are views illustrating an example of an appearance of an electronic device according to a first embodiment.

FIG. 8 is a view illustrating an example of a structure of an image sensor.

FIGS. 9A and 9B are views illustrating examples of a filter of the image sensor.

FIG. 12 is a view illustrating an example of a point spread function of a reference image according to the first embodiment.

FIGS. 15A, 15B, and 15C are views illustrating examples of an effective area determination device according to the first embodiment.

FIGS. 16A and 16B are views illustrating examples of determination of the effective area according to the first embodiment.

FIG. 17 is a view illustrating an example of an effective area table according to the first embodiment.

FIG. 21 is a view illustrating an example of a system including the electronic device according to the second embodiment.

DETAILED DESCRIPTION

Figure 1A:
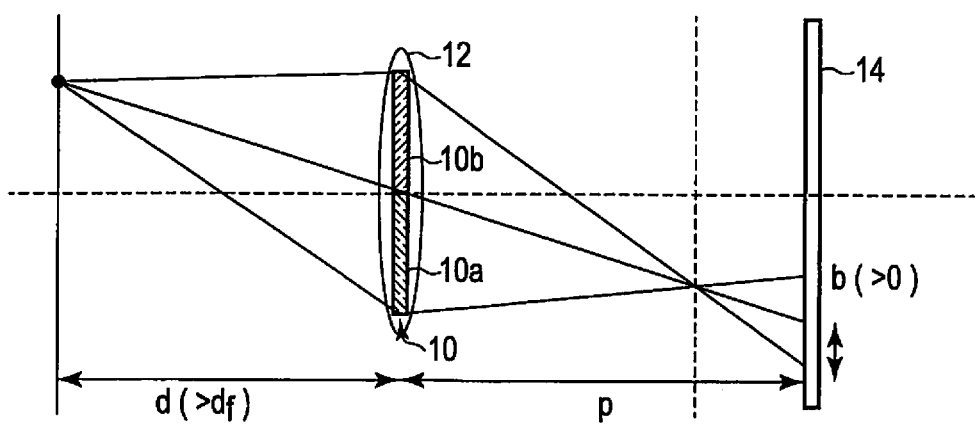
FIGS. 1A, 1B, and 1C are views illustrating examples of a change of a light beam depending on a distance of an object when a filter is added to an aperture of a lens.

Various embodiments will be described hereinafter with reference to the accompanying drawings. The disclosure is merely an example, and the invention is not limited by the contents described in the following embodiment. It is a matter of course that modifications easily conceivable by those skilled in the art are included in the scope of the disclosure. A size, a shape, and the like of each part are sometimes changed from those of an actual embodiment and schematically represented in the drawings in order to further clarify the description. In the drawings, corresponding elements are denoted by the same reference numerals, and a detailed description thereof is omitted in some cases.

In general, according to one embodiment, an electronic device includes one or more processors. The one or more processors are configured to obtain an image captured by a camera comprising a filter having a first area transmitting light of a first wavelength range and a second area transmitting light of a second wavelength range. The image includes a first color-component image based on the light of the first wavelength range transmitted through the first area and a second color-component image based on the light of the second wavelength range transmitted through the second area. The one or more processors are configured to notify a user of an effective area for calculation of depth information based on a bias of color information in the first color-component image and the second color-component image.

[Principle of Acquisition of Depth Information]

Figure 1B:
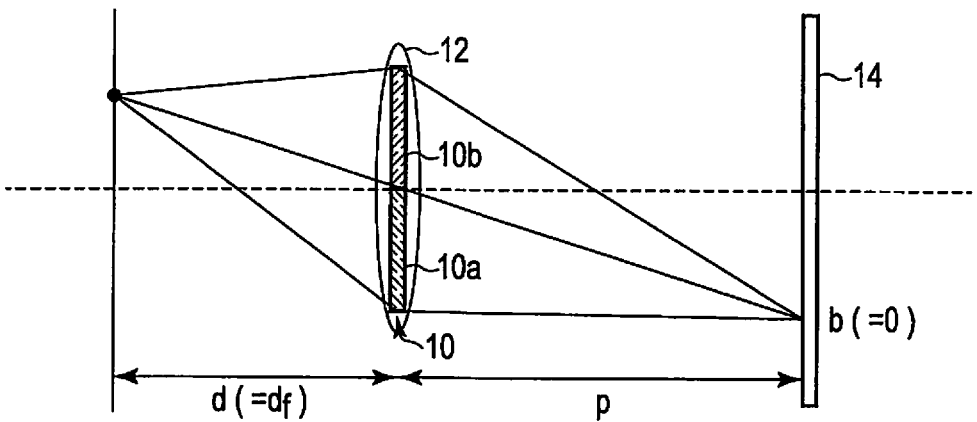
Figure 1C:
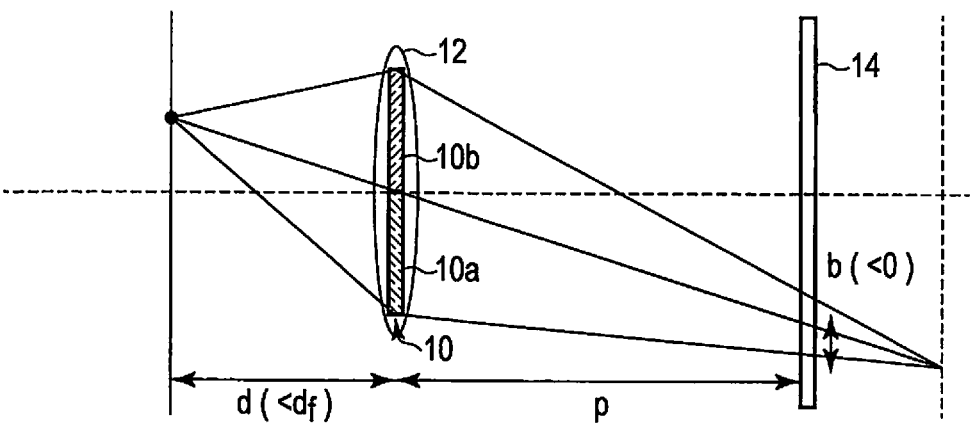
Figure 2:
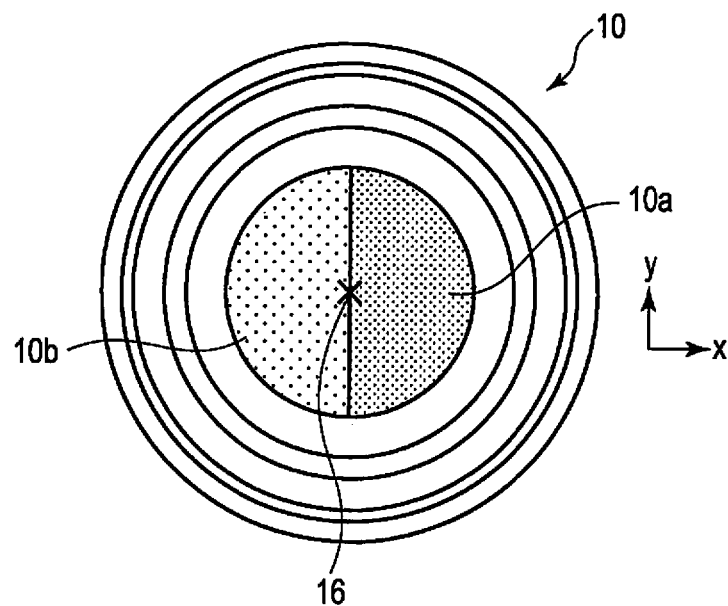
FIG. 2 is a view illustrating an example of the filter.

FIGS. 1A to 1C illustrate examples of a change of a light beam depending on a distance of an object when a filter 10 having different transmission characteristics of wavelength ranges is added to an aperture of a lens 12. FIG. 2 is a view illustrating an example of the filter 10. The filter 10 includes a plurality of, for example, two areas, a first filter area 10a and a second filter area 10b. An x direction is the left-right direction; a y direction is the up-down direction. The left-right direction is the left-right direction as viewed from the object. The center of the filter 10 coincides with an optical center 16 of the lens 12. The first filter area 10a and the second filter area 10b are arranged so as not to overlap with each other. In the example illustrated in FIG. 2, each of the first filter area 10a and the second filter area 10b has a semicircular shape in which the circular filter 10 is divided into right and left parts by a vertical line segment passing through the optical center 16. When an image sensor captures color-component images of three colors of red (R), green (G), and blue (B), the first filter area 10a transmits light of a wavelength range corresponding to a first combination of first two colors among R, G, and B, and the second filter area 10b transmits light of a wavelength range corresponding to a second combination of second two colors different from the first two colors.

Figure 3:
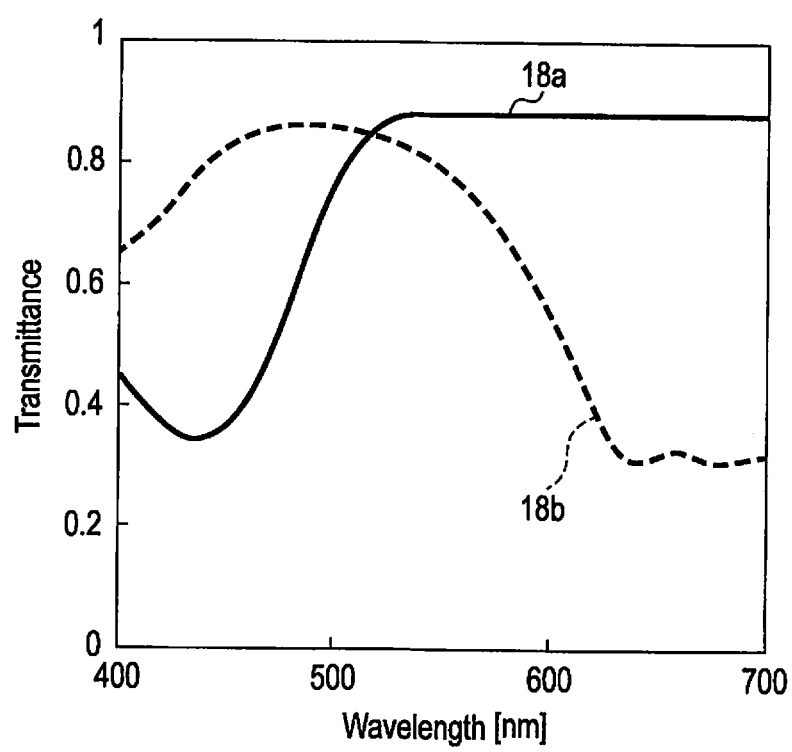
FIG. 3 is a view illustrating an example of transmittance characteristics of a first filter area and a second filter area of the filter.

FIG. 3 illustrates an example of transmittance characteristics of the first filter area 10a and the second filter area 10b. For example, the first filter area 10a is formed of a yellow (Y) filter that transmits a wavelength range of R and G images, and the second filter area 10b is formed of a cyan (C) filter that transmits a wavelength range of G and B images. A transmittance characteristic 18a of the first filter (Y filter) area 10a has a high transmittance in wavelength ranges of R and G images and a low transmittance in a wavelength range of B image. A transmittance characteristic 18b of the second filter (C filter) area 10b has a high transmittance in wavelength ranges of B and G images and a low transmittance in a wavelength range of R image.

Thus, light beams passing through the aperture of the lens 12 change for each color-component image of R, G, and B as illustrated in FIGS. 1A to 1C. Although the light beam in the wavelength range of the G image passes through both the first filter (Y filter) area 10a and the second filter (yellow filter) area 10b, the light beam in the wavelength range of the R image passes through only the first filter (Y filter) area 10a, and the light beam in the wavelength range of the B image passes through only the second filter (C filter) area 10b. Thus, shapes of blurs of the R image and the B image of a captured image vary depending on a distance "d" to an object. In addition, the aperture is divided into two, and thus, the shape of blur of the R image varies in an opposite direction of the shape of blur of the B image. The shape of blur of the R image varies in a first direction for a distance "d" shorter than df (in-focus distance) and in a second direction for a distance "d" longer than df. The shape of blur of the B image varies in the second direction for a distance "d" shorter than df and in the first direction for a distance "d" longer than df. Thus, it is possible to distinguish between a front focus and a rear focus, and it is possible to obtain depth information corresponding to the distance "d" from the shape of blur to the object.

The lens 12 may be arranged between the filter 10 and an image sensor 14 on an optical path of light incident on the image sensor 14 instead of arranging the filter 10 in the lens aperture. The filter 10 may be arranged between the lens 12 and the image sensor 14 on an optical path of light incident on the image sensor 14 instead of arranging the filter 10 in the lens aperture. Further, when the lens 12 includes a plurality of lenses, the filter 10 may be arranged between arbitrary two of the lenses 12. In addition, a magenta (M) filter that transmits the wavelength ranges of R and B images may be used instead of the Y filter or the C filter. In addition, the number of areas of the filter 10 is not limited to two, but may be three or more. A shape of the area is not limited to an example of FIG. 2 in which the whole is divided by a straight line passing through the center of a circle, but may adopt a configuration in which a plurality of areas is arranged in a mosaic pattern.

[Color Shift Unnecessary for Depth Estimation]

It is preferable to arrange the filter in the lens aperture in order to cause a blur for each of the plurality of color components in the image at any portion of the image, such as the center and periphery. For this purpose, however, it is necessary to customize a camera lens or to modify a commercially available camera lens. Thus, it is conceivable to arrange a color file on the outer side of the lens. FIGS. 4A, 4B, 5A, and 5B illustrate examples of a difference in a change of a light beam between the case where the filter is arranged in the lens aperture (FIGS. 4A and 4B) and the case where the filter is arranged on the outer side (the object side) of a front end of the lens (FIGS. 5A and 5B). FIGS. 4A, 4B, 5A, and 5B are views seen from the positive side (upper side) of the y axis.

Figure 4A:
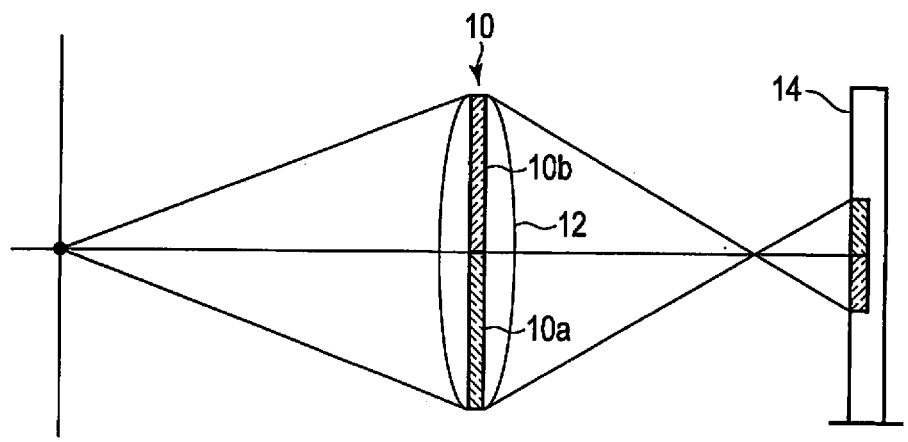
FIGS. 4A and 4B are views illustrating examples of a change of a light beam when the filter is arranged in a lens aperture.
Figure 4B:
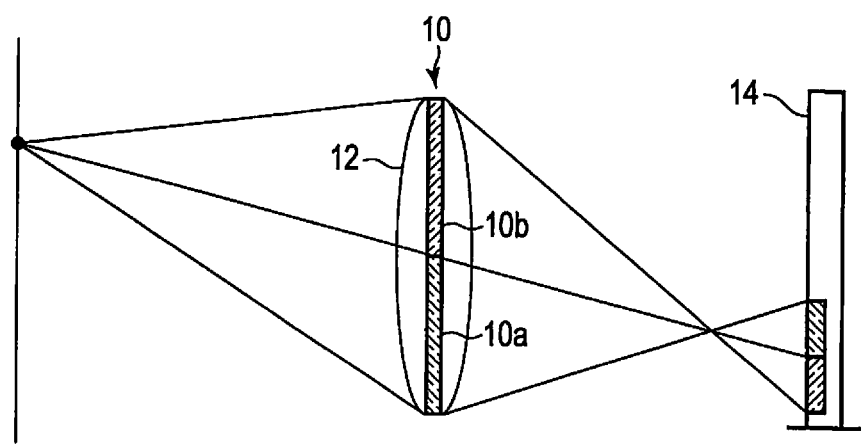
Figure 5A:
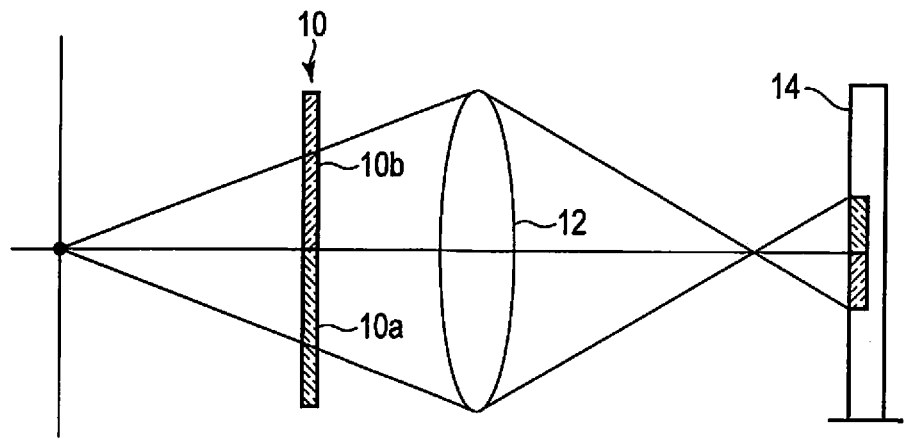
FIGS. 5A and 5B are views illustrating examples of a change of a light beam when the filter is arranged outside a front end of a lens.
Figure 5B:
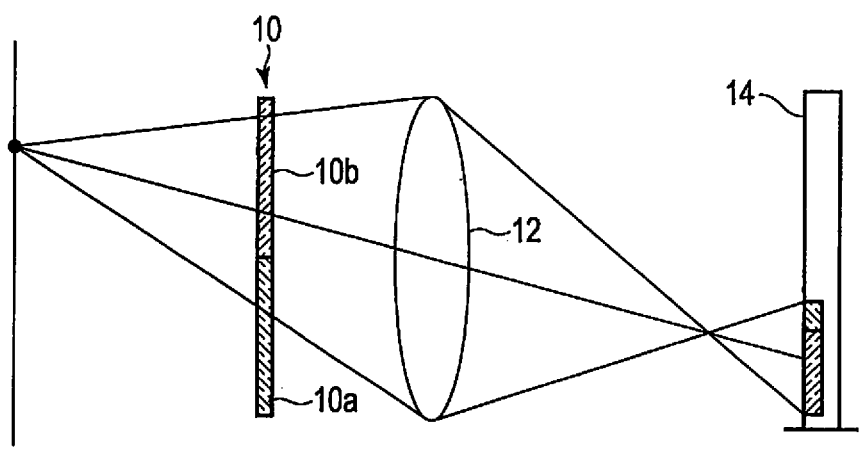

When the filter 10 is arranged in the aperture of the lens 12 as illustrated in FIGS. 4A and 4B, light beams from a central portion and a peripheral portion of the object also evenly pass through both the first filter area 10a and the second filter area 10b and are incident on the image sensor 14. However, when the filter 10 is fixed to be closer to the object side than the front end of the lens 12, for example, by screwing the filter 10 to a screw for filter attachment at the front end of the lens 12, or when the filter 10 is fixed to a front face of the lens 12 by a clip or the like such as a wide angle lens attachment of a smart phone, the light beams from the central portion of the object pass evenly through both the first filter area 10a and the second filter area 10b and are incident on the image sensor 14 as illustrated in FIG. 5A. However, the light beams from the peripheral portion of the object pass more through any one of the first filter area 10a and the second filter area 10b and pass less through the other area, and are incident on the image sensor 14 as illustrated in FIG. 5B. In this manner, when the filter is divided into the first and second filter areas on the right and left, it is difficult for the image sensor 14 to evenly capture the R image and the B image at right and left ends of the object, the balance between the R image and the B image collapses, and an undesirable color shift unnecessary for depth estimation occurs.

However, when the filter 10 is arranged in a portion other than the lens aperture, it is not necessarily difficult to measure the depth information at all. It is possible to obtain the depth information of the object in the central area of a screen, but there is a case where it is difficult to accurately obtain the depth information of the object in the peripheral area. An area of the object in which the image sensor 14 can evenly capture the R image and the B image is determined based on various parameters (hereinafter referred to as capturing parameters) relating to optical characteristics of the camera at the time of capturing the image. Thus, it is possible to specify an area in which a measurement error of the depth information is small enough to cause no problem in practical use, that is, an area where the reliability of the depth information is higher than the reliability of a reference. In addition, it is not always necessary to obtain the depth information of the entire screen, and there is a case where it is sufficient to obtain the depth information of a portion of the object positioned in the central area.

In the embodiment, the filter 10 which causes different blurs in a plurality of color components depending on a distance is arranged at a portion other than the lens aperture, and the user is notified of the reliability of the depth information. When the reliability is low, it is possible to obtain the depth information with high reliability by changing the composition of the camera to perform capturing again. As a result, it is not necessary to customize the camera lens or remodel the commercially available camera lens, and it is possible to provide an electronic device and a notification method which can easily obtain depth information with one camera.

Appearance of First Embodiment

FIGS. 6A and 6B illustrate the appearance of the electronic device of the first embodiment. FIG. 6A is a perspective view, and FIG. 6B is a side view illustrating a cross-sectional structure. As the electronic device of the first embodiment, a smart phone 40 can be used. The smart phone 40 is an example of an electronic device having a function of capturing an image and processing the captured image. As the embodiment, it is possible to use not only the smart phone 40 but also a camera, a portable information terminal such as a mobile phone having a camera function and a PDA (Personal Digital Assistant, Personal Data Assistant), or a personal computer having a camera function.

A clip-type attachment 44 is mounted to the smart phone 40 so as to cover a front face of a camera lens 42 of the smart phone 40. The attachment 44 includes a first lens barrel 46 having a diameter larger than a diameter of the camera lens 42, and a second lens barrel 48 is inserted into the inner side of the first lens barrel 46. A filter 52 is arranged at a front end of the second lens barrel 48. The filter 52 is formed of a first filter area 52a for yellow and a second filter area 52b for cyan, which is similar to the filter 10 illustrated in FIG. 2. When the user applies a rotational force to the second lens barrel 48, the second lens barrel 48 is rotated with respect to the first lens barrel 46. As a result, it is possible to adjust a direction of the filter 52 (a direction of an area division line by the first filter area 52a and the second filter area 52b). If the user does not apply a rotational force, the second lens barrel 48 is stationary with respect to the first lens barrel 46. A setscrew (not illustrated) or the like may be provided in the first lens barrel 46 so as to inhibit the rotation of the second lens barrel 48 after the adjustment of the direction of the filter 52.

There is a direction (edge direction) along which an edge extends as a condition of the object for which the depth information is required. An edge direction of a vertical object such as a pillar is a vertical direction, and an edge direction of a horizontal object such as a desk is a horizontal direction. The depth information can be obtained when an area division direction of the filter is parallel to the edge direction of the object. Since the two areas are arranged on the right and left in the filter illustrated in FIG. 2, the division direction is the longitudinal direction. Thus, the object for which the depth information can be obtained by using the filter illustrated in FIG. 2 is a vertical object having a vertical edge. Here, it is assumed that the edge direction of the object for which the depth information is desirably obtained is the vertical direction. The attachment 44 is mounted such that the area division direction of the filter 52 is parallel to the edge direction of the object. Thus, a marker 46a for defining an attachment position of the attachment 44 is marked on an outer surface of the first lens barrel 46, and a marker 48a is marked on an outer surface of the second lens barrel 48. The attachment 44 is mounted to the smart phone 40 such that the marker 46a matches an LED 40a of the smart phone 40, and the second lens barrel 48 is positioned with respect to the first lens barrel 46 such that positions of the marker 48a and the marker 46a are aligned. In this case, the depth information of the object whose edge direction is the vertical direction is obtained. When the edge direction of the object is the horizontal direction, to adjust the direction of the filter 52, the second lens barrel 48 is then rotated by the user such that the direction of the area division line of the filter 52 is in parallel to the edge direction.

The second lens barrel 48 is provided on the inner side of the first lens barrel 46, but may be provided on the outer side of the first lens barrel 46. In addition, when the edge direction of the object is parallel to the area division line of the filter 52, the smart phone 40 itself may be rotated such that the direction of the area division line intersects with the edge direction. In this case, the second lens barrel 48 is unnecessary since it is sufficient for the filter 52 not to be rotatable, and the filter 52 may be provided in the first lens barrel 46.

Electrical Configuration of First Embodiment

Figure 7:
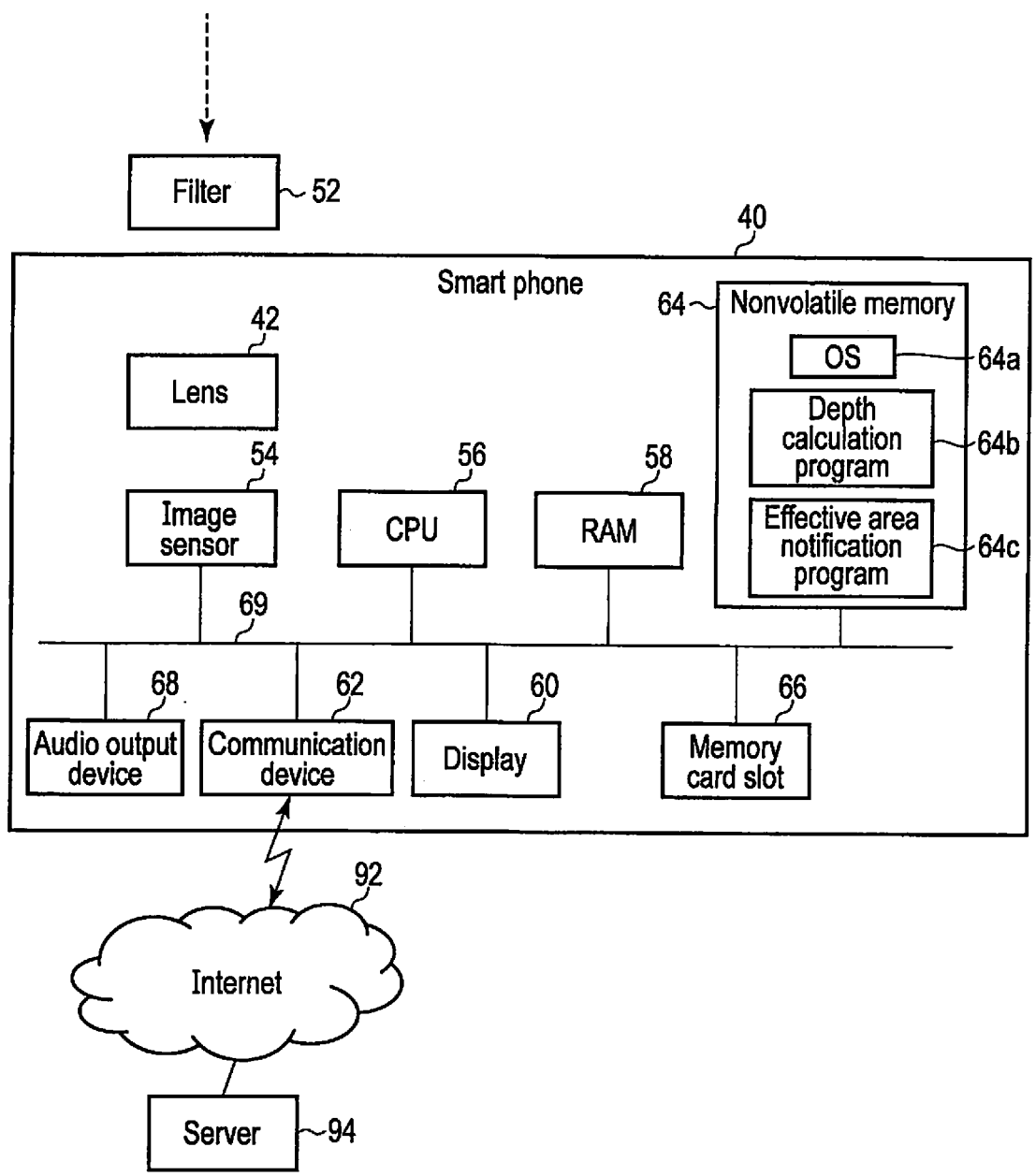
FIG. 7 is a block diagram illustrating an example of an electrical configuration of the electronic device according to the first embodiment.

FIG. 7 is a block diagram illustrating an example of an electrical configuration of the smart phone 40. The smart phone 40 includes the filter 52, an image sensor 54 that captures an object image incident through a lens 42, a CPU 56, a RAM 58, a display 60, a communication device 62, a nonvolatile memory 64, a memory card slot 66, and an audio output device 68. The image sensor 54, the CPU 56, the RAM 58, the display 60, the communication device 62, the nonvolatile memory 64, the memory card slot 66, and the audio output device 68 are mutually connected via a bus line 69.

The CPU 56 is a digital hardware processor that controls operations of various components in the smart phone 40. The CPU 56 executes various programs loaded from the nonvolatile memory 64, which is a storage device, onto the RAM 58. The nonvolatile memory 64 also stores an operating system (OS) 64a in addition to various application programs. Examples of the various application programs are a depth calculation program 64b and an effective area notification program 64c. The nonvolatile memory 64 can also store an image captured by the image sensor 14 and processing results according to the programs 64b and 64c for that image.

The communication device 62 is an interface device configured to execute wired communication or wireless communication. The communication device 62 includes a transmitter that transmits a signal in a wired or wireless manner, and a receiver that receives a signal in a wired or wireless manner. For example, the communication device 62 can connect the smart phone 40 to an external server 94 via the Internet 92.

The display 60 is, for example, a Liquid Crystal Display (LCD). The display 60 displays a screen image based on a display signal generated by the CPU 56 or the like. For example, the display 60 has a function of displaying a captured image and depth information, and has a function of notifying the user of the reliability of the depth information by displaying the reliability itself or information corresponding to the reliability as text, an icon, a mark, or the like. The display 60 may be a touch screen display. In that case, for example, a touch panel is arranged on a front face of the LCD. The touch panel is a capacitance-type pointing device configured to perform an input on a screen of the LCD. A touch position on the screen touched by a finger and movement of the touch position are detected by the touch panel.

The audio output device 68 is a speaker, an earphone jack, or the like, and notifies the user of the reliability itself or the information corresponding to the reliability as a voice.

Into the memory card slot 66, memory cards, which are various portable storage media such as an SD (registered trademark) memory card and an SDHC (registered trademark) memory card can be inserted. When a storage medium is inserted into the memory card slot 66, write and read of data to and from the storage medium can be executed. The data is, for example, image data or depth information.

The application program may not be built in the smart phone 40. For example, the depth calculation program 64b may be provided not in the smart phone 40 but in the server 94. In this case, it suffices that an image captured by the image sensor 54 is transmitted to the server 94 by the communication device 62, depth information is obtained by the depth calculation program provided in the server 94, and the depth information is returned to the smart phone 40. In addition, the depth calculation program 64b and the effective area notification program 64c may be provided not in the smart phone 40 but in the server 94. In this case, it suffices that an image captured by the image sensor 54 is transmitted to the server 94 by the communication device 62, depth information is obtained by the depth calculation program provided in the server 94, an effective area is determined by the effective area notification program provided in the server 94, and the depth information and notification information of the effective area are returned to the smart phone 40.

[Image Sensor]

The image sensor 54, for example a CCD image sensor includes photodiodes as light receiving elements arrayed in a two-dimensional matrix and a CCD transferring signal charges generated by photoelectric conversion of incident light by the photodiodes. FIG. 8 illustrates an example of a cross-sectional structure of a portion of the photodiode. A large number of n-type semiconductor areas 72 are formed in a surface area of a p-type silicon substrate 70, and a large number of photodiodes are formed by pn junctions between the p-type substrate 70 and the n-type semiconductor areas 72. Here, two photodiodes form one pixel. Therefore, each photodiode is also referred to as a subpixel. A light shielding film 74 for suppression of crosstalk is formed between the respective photodiodes. A multilayer wiring layer 76 in which a transistor, various wirings and the like are provided is formed on the p-type silicon substrate 70.

A color filter 80 is formed on the wiring layer 76. The color filter 80 includes a large number of filter elements which transmit, for example, red (R), green (G), or blue (B) light for each pixel and are arrayed in a two-dimensional array. Thus, each pixel generates only image information on any color component among R, G, and B. Image information on color components of the other two colors, which are not generated by the pixel, is obtained by interpolation from color-component image information of surrounding pixels. There is a case where moire or a false color is generated during the interpolation in capturing a periodically repetitive pattern. In order to prevent such a case, an optical low-pass filter, which is made of quartz or the like and slightly blurs the repetitive pattern, may be arranged between the lens 42 and the image sensor 54 although not illustrated. The similar effect may be obtained by signal processing of an image signal, instead of providing the optical low-pass filter.

A microlens array 82 is formed on the color filter 80. The microlens array 82 is formed of a two-dimensional array of a pair of microlenses 82a and 82b corresponding to one pixel. FIG. 8 illustrates a front-illuminated type of the image sensor 54, but the image sensor 54 may be a back-illuminated type. The two photodiodes constituting one pixel are configured to receive the light that has passed through different areas of an exit pupil of the lens 42 via the pair of microlenses 82a and 82b, whereby so-called pupil division is realized.

FIG. 9A is a plan view illustrating an example of a relationship among photodiodes 84a and 84b and the microlenses 82a and 82b constituting each pixel. As illustrated in FIG. 9A, light passing through the first filter area 10a of the filter 52 is incident on the photodiode 84a serving as a first subpixel. Light passing through the second filter area 10b of the filter 52 is incident on the photodiode 84b serving as a second subpixel.

FIG. 9B illustrates an example of the color filter 80. The color filter 80 is, for example, a primary filter having Bayer array. Accordingly, the image sensor 54 includes an R pixel that senses red light, a G pixel that senses G light, and a B pixel that senses blue light. The color filter 80 may be a complementary filter. Further, when it is not necessary to capture a color image but it is sufficient to obtain only the depth information, the image sensor 54 is not necessarily a color sensor, but may be a monochrome sensor, and the color filter 80 may be omitted.

The image sensor 14 is not limited to the CCD sensor but may be a complementary metal oxide semiconductor (CMOS) sensor.

[Blur Shape According to Filter]

Figure 10:
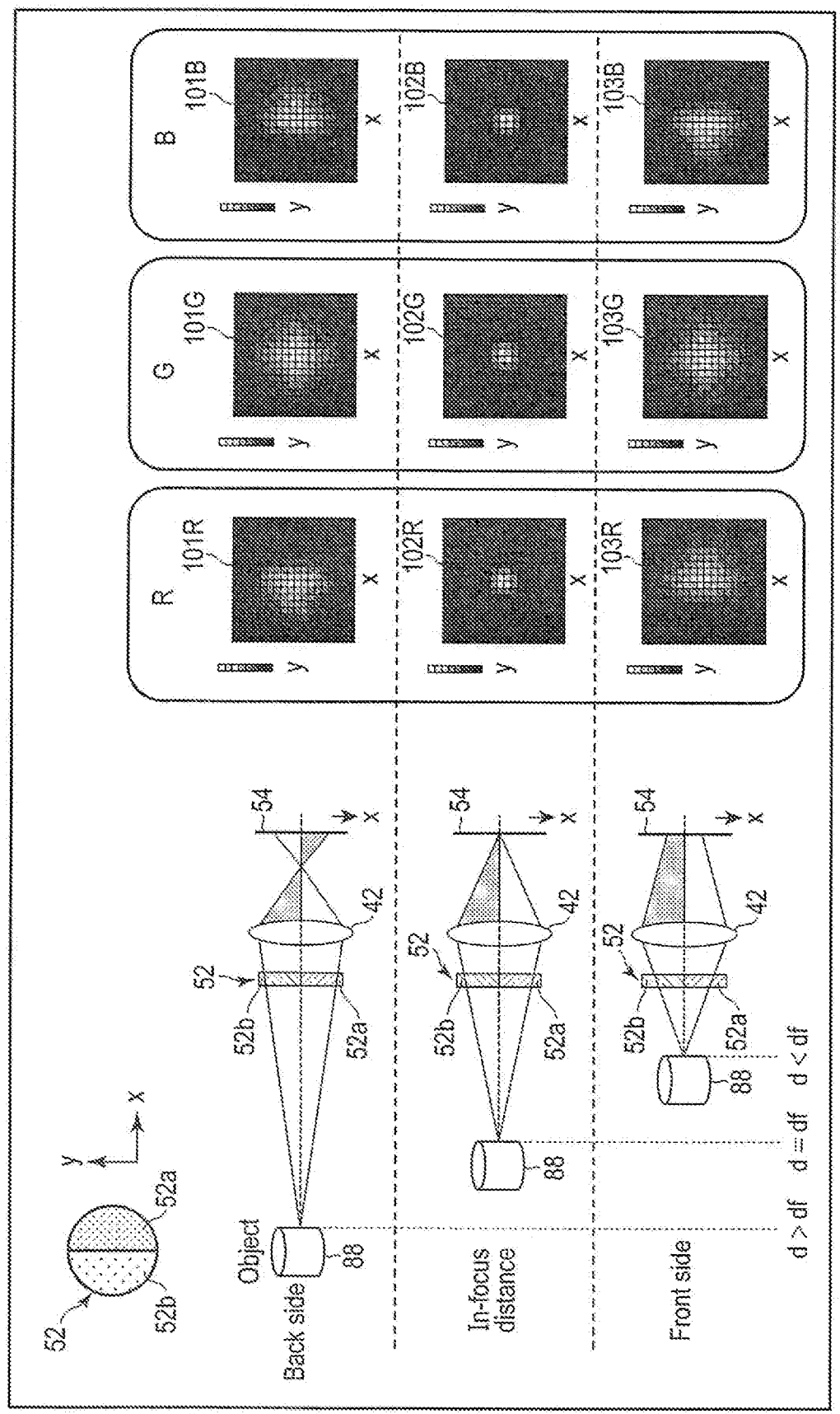
FIG. 10 is a view illustrating an example of a relationship between a change of a light beam caused by the filter and a shape of a blur.

With reference to FIG. 10, a change of a light beam and a shape of a blur according to the filter 52 will be described. The filter 52 is formed of the first filter area 52a for yellow and the second filter area 52b for cyan. When an object 88 is at the back side father than an in-focus distance df (d>df), a blur occurs in an image captured by the image sensor 54. A blur function (also called a point spread function (PSF)) indicating a shape of a blur on the image differs among an R image, a G image, and a B image. A point spread function 101R of the R image indicates a shape of a blur biased to the left, a point spread function 101G of the G image indicates a shape of an unbiased blur, and a point spread function 101B of the B image indicates a shape of a blur biased to the right.

When the object 88 is at the in-focus distance df (d=df), almost no blur occurs in three color images captured by the image sensor 54. The point spread function indicating a shape of a blur on the image is almost the same among an R image, a G image, and a B image. That is, a point spread function 102R of the R image, a point spread function 102G of the G image, and a point spread function 102B of the B image indicate the shape of the unbiased blur.

When the object 88 is at the front side closer than the in-focus distance df (d<df), a blur occurs in an image captured by the image sensor 54. The point spread function indicating a shape of a blur on the image is different among an R image, a G image, and a B image. A point spread function 103R of the R image indicates a shape of a blur biased to the right, a point spread function 103G of the G image indicates a shape of an unbiased blur, and a point spread function 103B of the B image indicates a shape of a blur biased to the left.

In the present embodiment, depth information up to the object is calculated for each pixel of an image using such characteristics.

Functional Configuration of Embodiment

Figure 11:
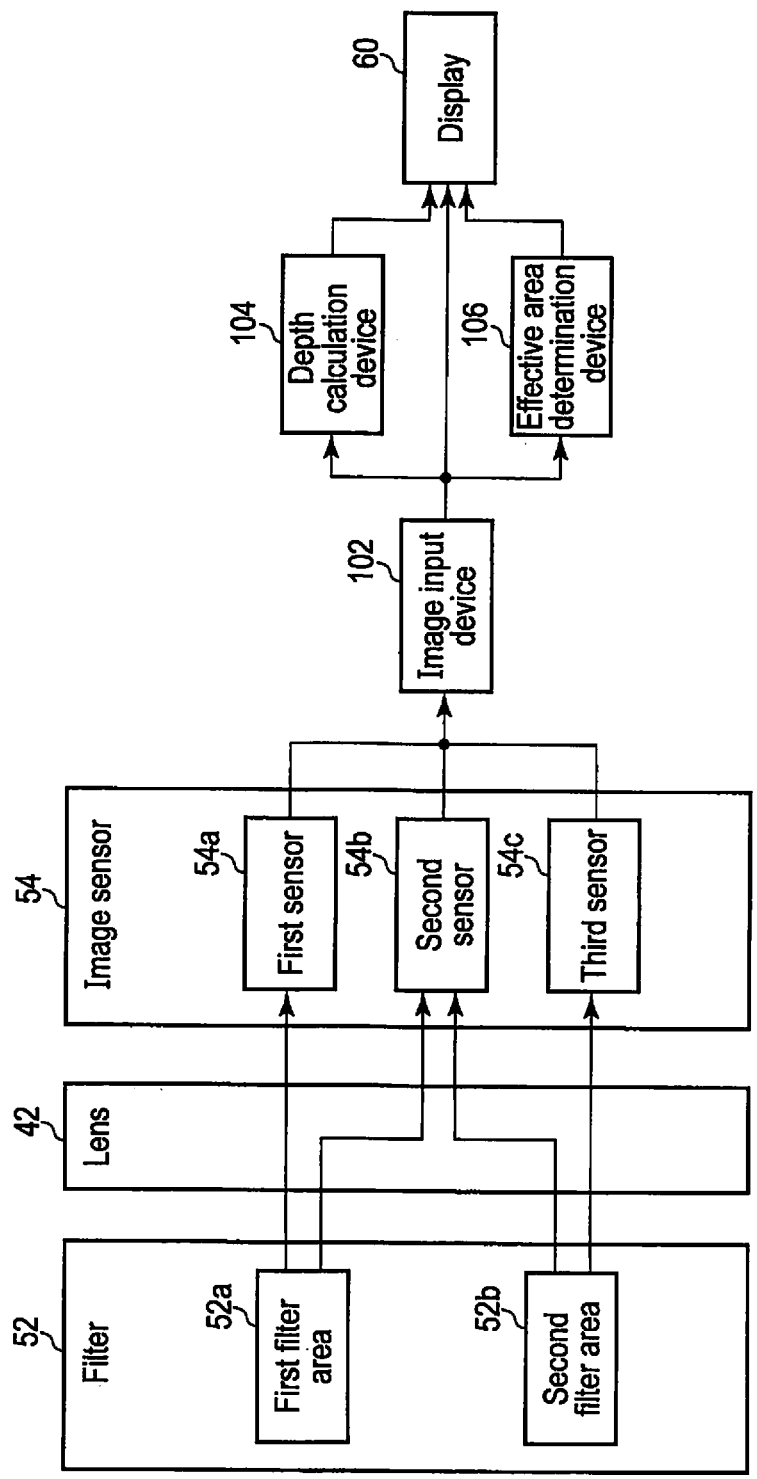
FIG. 11 is a block diagram illustrating an example of a functional configuration of the electronic device according to the first embodiment.

FIG. 11 is a block diagram illustrating an example of a functional configuration of the smart phone 40. An arrow from the filter 52 to the image sensor 54 indicates a path of light. An arrow ahead of the image sensor 54 indicates path of an electric signal.

R light having passed through the first filter (Y) area 52a of the filter 52 is incident on an R pixel (referred to as a first sensor) 54a of the image sensor 54 via the lens 42, and G light having passed through the first filter (Y) area 52a of the filter 52 is incident on a G pixel (referred to as a second sensor) 54b of the image sensor 54 via the lens 42. G light having passed through the second filter (C) area 52b of the filter 52 is incident on the second sensor 54b of the image sensor 54 via the lens 42, and B light having passed through the second filter (C) area 52b of the filter 52 is incident on a B pixel (referred to as a third sensor) 54c of the image sensor 54 via the lens 42.

Output signals of the first sensor 54a, the second sensor 54b, and the third sensor 54c are input to an image input device 102. The image input device 102 acquires a G image whose point spread function (PSF) indicates a shape of an unbiased blur as a reference image and acquires one or both of an R image and a B image whose point spread function indicates a shape of a biased blur as a target image. The target image and the reference image are images captured at the same time by the same camera.

The output signal of the image input device 102 is supplied to a depth calculation device 104, an effective area determination device 106, and the display 60. Outputs from the depth calculation device 104 and the effective area determination device 106 are also supplied to the display 60.

[Depth Calculation]

The depth calculation device 104 calculates depth information up to the object appearing on the image for 0.25 each pixel using a blur correction filter. The depth information may be calculated in units of pixel blocks of a set of a plurality of pixels, instead of calculating the depth information for each pixel. If the target image is corrected based on the blur correction filter, a correlation between the target image after the correction and the reference image becomes higher than a correlation between the target image before the correction and the reference image. A method of calculating the correlation between the corrected target image and the reference image will be described later. When the target image is corrected based on the blur correction filter, the shape of the blur of the target image approaches the shape of the blur of the reference image.

In the embodiment, plural blur correction filters for each of plural distances, created by assuming the plural distances as the distance to the object appearing on the image, are prepared. The target image is corrected with the plural blur correction filters for the plural distances to obtain plural corrected images. One of the plural corrected images with which the correlation for the reference image is the highest is searched for. A distance corresponding to the blur correction filter with which the corrected image has the highest correlation is determined as the depth information up to the object. However, a blur correction filter that satisfies the above condition may be obtained by calculation, instead of selecting one blur correction filter from among the plurality of blur correction filters prepared in advance.

The depth calculation device 104 may further output a distance image obtained by coloring each pixel of the image in accordance with the depth information.

The point spread function of the captured image is determined depending on a shape of the filter 52 (a form of area division) and a distance between a position of the object and a focus position. FIG. 12 is a view illustrating an example of the point spread function of the reference image according to the embodiment. An aperture shape through which a wavelength range of G light corresponding to the second sensor 54b is transmitted is a circular shape that is point symmetric, and thus, as illustrated in FIG. 12, a shape of a blur indicated by a point spread function does not change before and after a focus position, and a width of the blur changes depending on a distance between an object and the in-focus position. Such a point spread function indicating the blur shape can be expressed as a Gaussian function in which the width of the blur changes depending on the distance between the object and the in-focus position. The point spread function may be expressed as a pill box function in which the width of the blur changes depending on the distance between the object and the in-focus position.

Figure 13:
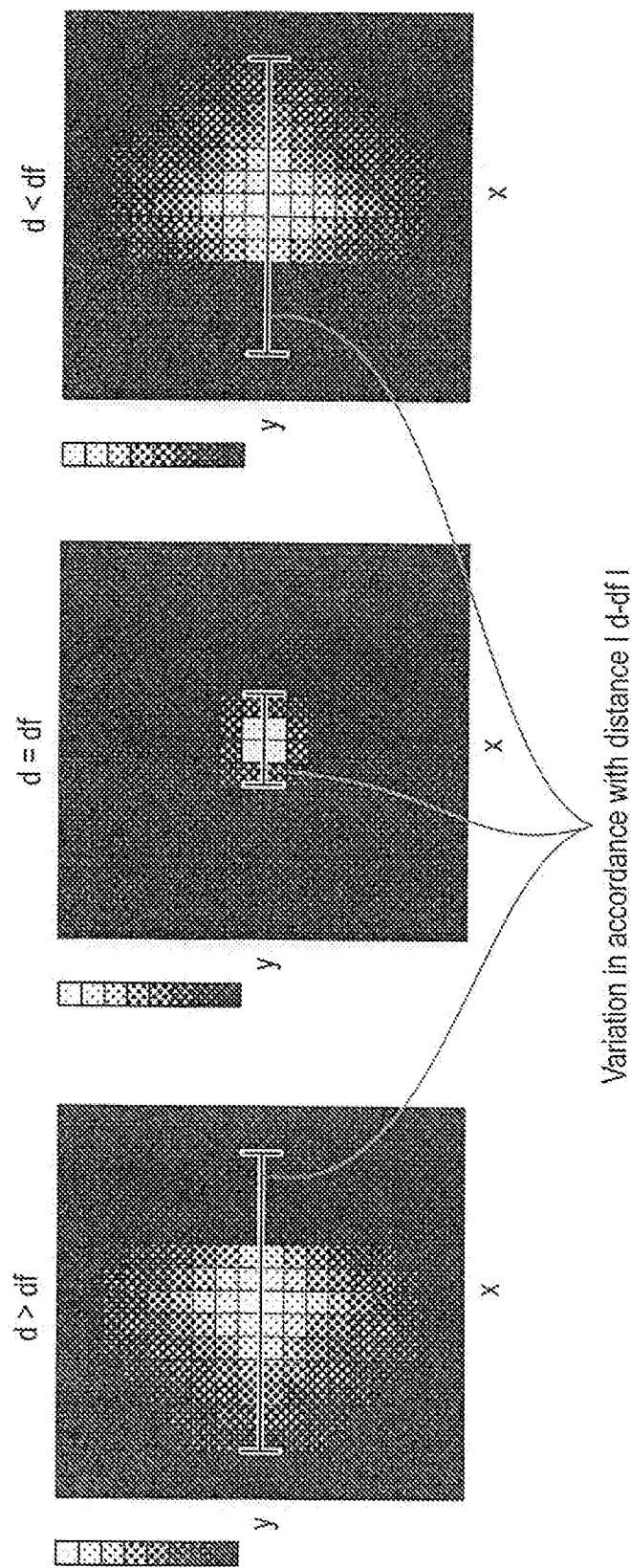
FIG. 13 is a view illustrating an example of a point spread function of a target image according to the first embodiment.

FIG. 13 is a view illustrating an example of the point spread function of the target image according to the embodiment. The center of each drawing is (x, y)=(0, 0). As illustrated in FIG. 13, the point spread function of the target image (for example, the R image) can be expressed as a Gaussian function in which a width of a blur attenuates at x>0 when d>df where the object is positioned farther than the in-focus position. In addition, the point spread function of the target image (for example, the R image) can be expressed as a Gaussian function in which the width of the blur attenuates at x<0 when d<df where the object is positioned closer than the in-focus position. The point spread function of the other target image (for example, the B image) can be expressed as a Gaussian function in which the width of the blur attenuates at x<0 when d>df where the object is positioned farther than the in-focus position. In addition, the point spread function of the B image can be expressed as a Gaussian function in which the width of the blur attenuates at x>0 when d<df where the object is closer than the in-focus position.

It is possible to obtain the plural blur correction filters configured to correct the blur shape of the target image to the blur shape of the reference image by analyzing the point spread function of the reference image and the point spread function of the target image.

Figure 14:
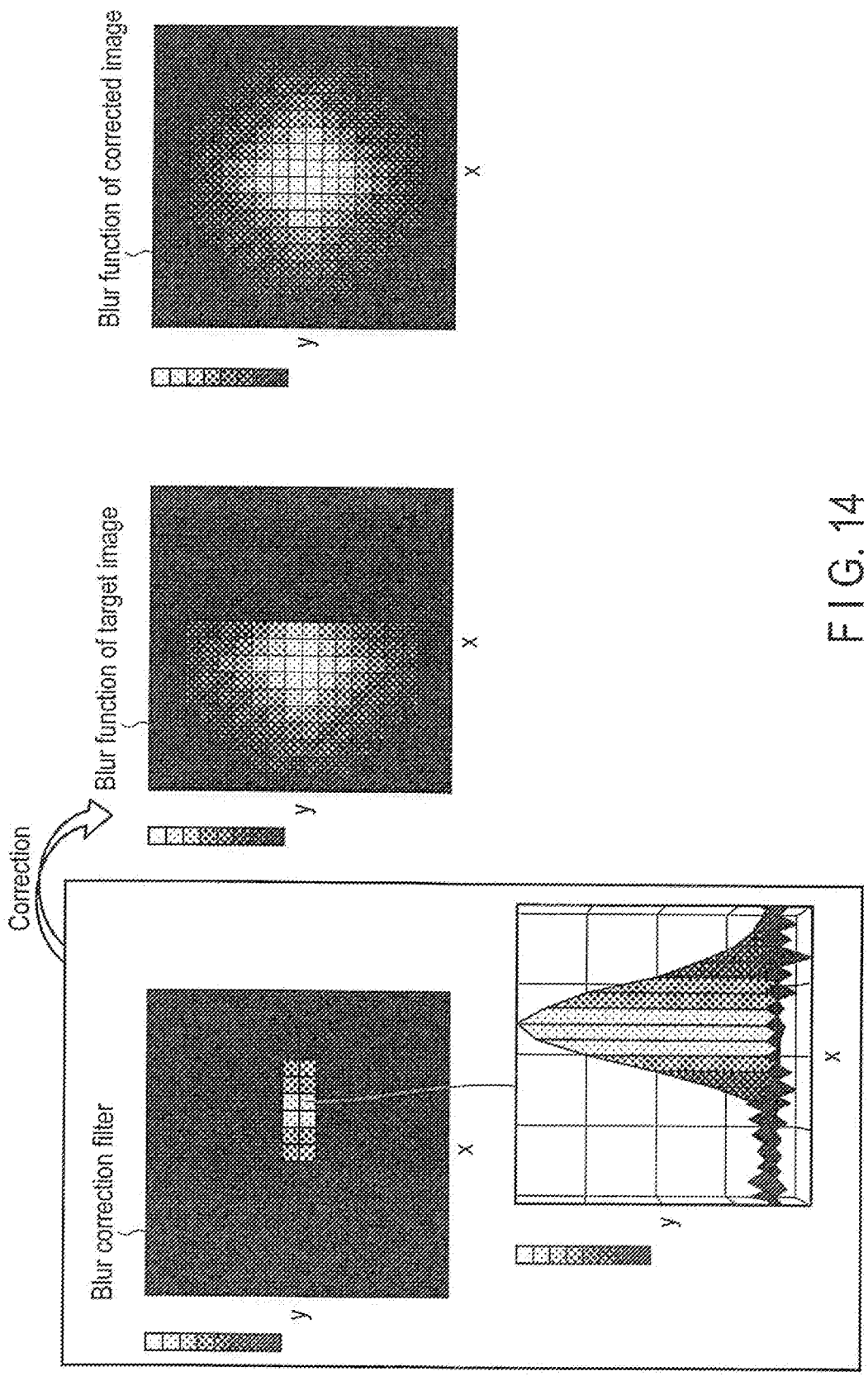
FIG. 14 is a view illustrating an example of a blur correction filter according to the first embodiment.

FIG. 14 is a view illustrating an example of the blur correction filter according to the embodiment. The blur correction filter is distributed on a straight line (horizontal direction) passing through a center point of a line segment (vertical direction) of a boundary between the first filter area 52a and the second filter area 52b and is orthogonal to this line segment. Such distribution is a mountain-like distribution as illustrated in FIG. 14. A peak point (a position on the straight line and a height) and a spread state from the peak point are determined based on an assumed distance. The blur shape of the target image can be corrected to various blur shapes assuming arbitrary distances by using the blur correction filter for the distances. That is, it is possible to generate a corrected image assuming an arbitrary distance.

The depth calculation device 104 obtains depth information at which the blur shape of the corrected target image and the blur shape of the reference image are most matched at each pixel of the captured image. The degree of matching the blur shape may be calculated by calculating a correlation between the corrected image and the reference image in a rectangular area having an arbitrary size with each pixel as the center. The calculation of the degree of coincidence of the blur shape may be performed using an existing similarity evaluation method. The depth calculation device 104 obtains depth information corresponding to a correction filter with which the correlation between the corrected image and the reference image becomes the highest and calculates the depth information up to the object appearing on each pixel. For example, a sum of squared differences (SSD), a sum of absolute differences (SAD), a normalized cross-correlation (NCC), a zero-normal normalized cross-correlation (ZNCC), a color alignment measure, or the like may be used as the existing similarity evaluation method. In the present embodiment, the color alignment measure utilizing a fact that a color component of a natural image has a locally linear relationship may be used. In the color alignment measure, an index representing a correlation is calculated from a variance of color distribution of a local boundary having a target pixel of a captured image as the center.

[Notification of Reliability of Depth Information]

The embodiment has a function of obtaining the reliability of the depth information calculated by the depth calculation device 104 and notifying the user of information corresponding to the reliability. As an example of notification of the information corresponding to the reliability, there is a case where an effective area formed of pixels whose reliability is higher than reference reliability is obtained and the user is notified of the effective area. Several examples of the effective area determination device 106 illustrated in FIG. 11 relating to such notification are illustrated in FIGS. 15A, 15B, and 15C.

The effective area determination device 106a illustrated in FIG. 15A includes an effective area calculation device 112 and a capturing parameter input device 114. Since the effective area is determined based on capturing parameters, the effective area calculation device 112 calculates the effective area based on the capturing parameters input from the capturing parameter input device 114.

The capturing parameters include brightness (an F value) and a focal length of the lens, a distance between the filter and the lens aperture, a size of the image sensor, and the like. The capturing parameter input device 114 may display a parameter input/selection screen on the display 60. For example, the user can input each capturing parameter using the touch panel provided on the display 60. The brightness of the lens, the focal length, and the size of the image sensor are values unique to the smart phone 40, and thus, may be configured to be automatically input when the effective area notification program 64c is installed in the smart phone 40. In addition, when the lens 42 has an optical zoom function, the focal length is variable, and thus, it may be configured such that focal length information may be input from a zoom mechanism. The distance between the filter and the lens aperture is a value unique to the attachment 44, and thus, needs to be input for each of the attachments 44. However, it may be configured such that the capturing parameter input device 114 includes a table storing such distance for each type of the attachments 44 and the user inputs the type of the attachment 44 instead of the distance itself.

When the filter 52 having a vertically divided configuration similar to that of the filter 10 as illustrated in FIG. 2 is used, an effective area is a vertically long area having a certain width with a screen center as the center, and thus, the effective area calculation device 112 calculates coordinates of right and left edges of the effective area (for example, the number of pixels from the center of the screen in the left-right direction) based on the capturing parameters.

An example of the calculation of the effective area will be described. When an object whose pixel value has been known for all pixels on the screen, for example, a pure white background is captured using the filter 52 as illustrated in FIG. 2, the captured image is white near the center in the left-right direction, becomes bluish as proceeding to a right end, and becomes reddish as proceeding to a left end as illustrated in FIG. 16A. FIG. 16B illustrates a cross-sectional profile of a pixel value (luminance) of the captured image along a broken-line portion of FIG. 16A. Once the capturing parameters are known, the cross-sectional profile can be calculated by an optical simulation program. Thus, the effective area calculation device 112 calculates the cross-sectional profile as illustrated in FIG. 16B by optical simulation based on the capturing parameters input from the capturing parameter input device 114. Further, the effective area calculation device 112 calculates position coordinates of right and left ends of an effective area in which an R pixel value and a B pixel value are equal to or higher than a predetermined luminance. The predetermined luminance relates to reference reliability. The reference reliability to determine the effective area may be varied in accordance with an allowable value of a measurement error of depth information (referred to as a depth request level). That is, the predetermined luminance increases and the effective area is narrowed when the depth request level is high, and the predetermined luminance decreases and the effective area is widened when the depth request level is low. The depth request level is also input from the capturing parameter input device 114. Information on the determined effective area is displayed on the display 60 or output as a sound via the audio output device 68.

An effective area determination device 106b illustrated in FIG. 15B includes the capturing parameter input device 114, an effective area acquisition device 116, and an effective area memory 118. The cross-sectional profile as illustrated in FIG. 16B can be calculated in advance by optical simulation for various capturing parameters and depth request levels by the effective area calculation device 112 illustrated in FIG. 15A, and an effective area table indicating effective areas for the various capturing parameters and depth request levels is stored in the effective area memory 118. The depth request level is not indispensable. When effective areas are stored as a table, information indicating a pre-calculated effective area depending only on the capturing parameters may be stored and the effective area is not necessarily variable depending on the depth request level. Without performing the calculations by the optical simulation program, a captured image obtained by capturing an object whose pixel value has been known for all pixels on the screen, for example, a pure white background may be analyzed to obtain position coordinates of right and left ends of an effective area where an R pixel value and a B pixel value are equal to or higher than the predetermined luminance, and the position coordinates may be stored in the memory 118.

An example of the effective area table in the effective area memory 118 is illustrated in FIG. 17. The effective area acquisition device 116 reads information on an effective range corresponding to the capturing parameter and the depth request level input from the capturing parameter input device 114 from the effective area memory 118. When the lens has the optical zoom function, the focal length is variable, but the effective area is the same for a certain focal length range, and thus, it is sufficient to obtain an effective area for each of several focal length ranges within a variable range of the focal length and register the obtained effective area in the table. The information on the effective area read out from the effective area memory 118 is displayed on the display 60 or is output as the sound via the audio output device 68.

The effective area can also be obtained statistically by machine learning. An estimation error can be obtained by estimating the depth based on a certain capturing parameter for a scene and/or a pixel pattern for which correct depth information has been known. If the estimation error is obtained for a sufficient number of scenes and/or pixel patterns, statistics of the estimation error between the capturing parameters and the scene and/or image patterns are obtained. Thus, when the capturing parameters and the scenes and/or the image patterns are specified, the effective area calculation device 112 of FIG. 15A can obtain the statistics of the estimation error.

For example, when using a variance as the statistic, an area with a large variance of the estimation error can be determined as an area with low reliability. A statistical model expressing a relationship between the statistics and reliability can be acquired by machine learning such as neural network if learning data for which correct depth information has been known is prepared. The acquired statistical model is stored in the capturing parameter input device 114, and is input to the effective area calculation device 112 when calculating the effective area. As a result, the effective area calculation device 112 obtains the reliability based on the statistical model according to the machine learning of the capturing parameters and the scenes and/or image patterns, and obtains an effective area whose reliability is higher than the reference reliability.

The effective area calculation device 112 illustrated in FIG. 15A and the effective area memory 118 illustrated in FIG. 15B are not necessarily provided in the smart phone 40 of the embodiment but may be provided in the server 94. FIG. 15C illustrates an example of an effective area determination device 106c in such a case. The effective area determination device 106c includes the capturing parameter input device 114 and the effective area acquisition device 120. A capturing parameter input from the capturing parameter input device 114 to the effective area acquisition device 120 is transmitted to the server 94 via the communication device 62. An effective area is calculated by the server 94 or read from the effective area memory, information on the effective area is returned to the communication device 62, and the effective area acquisition device 120 acquires the information on the effective area. The information on the effective area received by the communication device 62 is displayed on the display 60 or is output as a sound via the audio output device 68.

Figure 18:
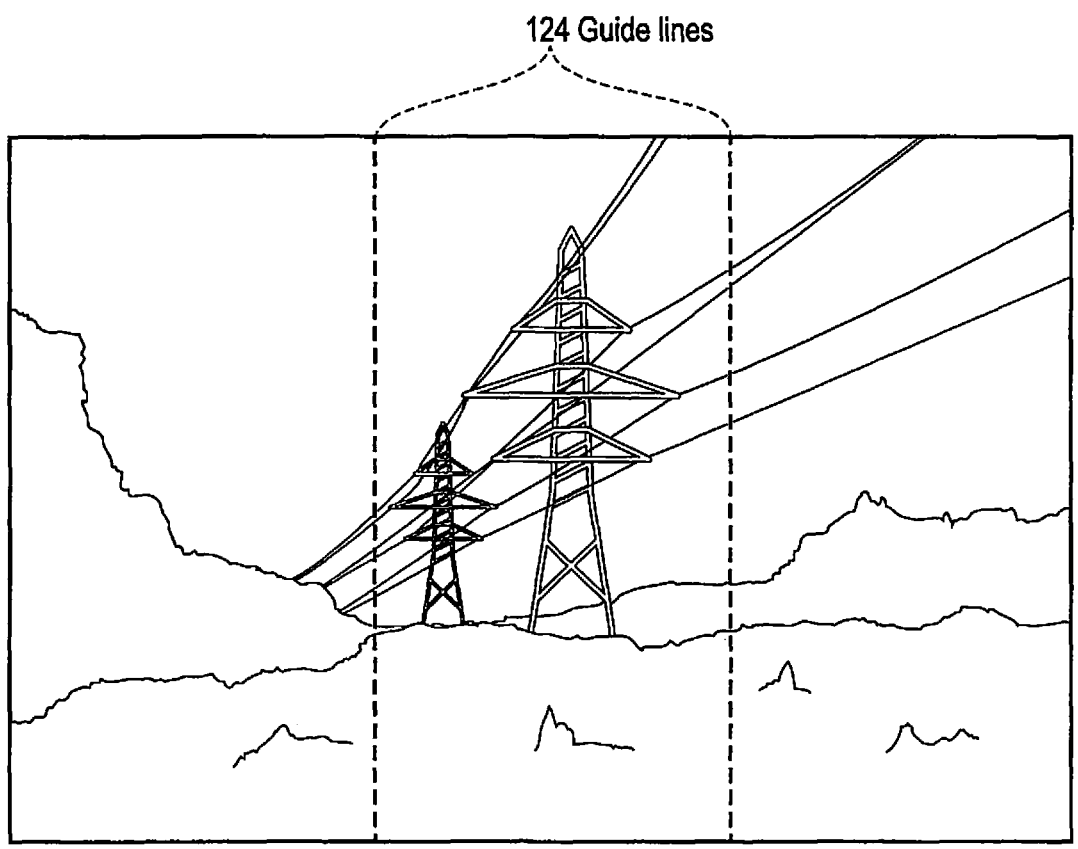
FIG. 18 is a view illustrating an example of a guide line indicating the effective area according to the first embodiment.

FIG. 18 illustrates an example of the information on the effective area displayed on the display 60. An image acquired by the image input device 102 is displayed on the display 60. A pair of guide lines 124 indicating right and left ends of the effective area are displayed on this image. The user can see the image on which the guide lines 124 are displayed and confirm whether a measurement target for which depth information is to be obtained is positioned within the effective area. When the measurement target is positioned outside the effective area, it is possible to position the measurement target within the effective area by changing the composition or the like.

Therefore, even if a color shift occurs due to the filter positioned in the portion other than the lens aperture, it is possible to make a measurement error of depth information of the measurement target below an allowable value. Since an arrangement direction of the filter 10 (the direction of the boundary line between the first filter area and the second filter area) is set to the vertical direction, the effective area is the vertically long area having the certain width with the screen center as the center. But, the effective area differs depending on the arrangement direction of the filter 10. For example, if the arrangement direction of the filter 10 is set to be the horizontal direction, the effective area is a horizontally (or laterally) long area having a certain width with the screen center as the center.

As a modified example of FIG. 18, an image obtained by clipping only the effective area may be displayed, instead of displaying the guide lines 124. That is, a background having a constant luminance, for example, a black background may be displayed, instead of an image on the right of the right guide line and an image on the left of the left guide line of FIG. 18. Further, an image may be displayed by changing a color, brightness, or contrast between an effective area and a remaining area (a non-effective area). When an image is displayed by changing the color, brightness, or contrast of the image, it is not limited to the binary change between the effective area and the non-effective area, and these values may be successively changed in accordance with the reliability. As described with reference to FIGS. 16A and 16B, the reliability itself can be obtained based on the cross-sectional profile of the pixel value (luminance) of the captured image. For example, it is possible to determine that a cross-sectional position where a difference between an R pixel value and a B pixel value is large has a color shift so that the reliability is low, and that a cross-sectional position where the difference between the R pixel value and the B pixel value is small has no color shift so that the reliability is high. Further, a reliability map obtained by coloring each pixel of the captured image in accordance with the reliability may be displayed and saved, and the reliability (a numerical value) for each pixel may be displayed and saved in a form of a table corresponding to the pixel. The reliability map and the reliability table may be displayed together with the captured image.

In addition, the effective area may be displayed on the display 60 as an image to be presented to the user. If the position of the effective area or the guide lines 124 can be determined in advance, the effective area may be presented to the user by physical means such as sticking a seal to areas other than the effective area such that a portion other than the effective area on the display 60 is not viewed by the user.

Figure 19:
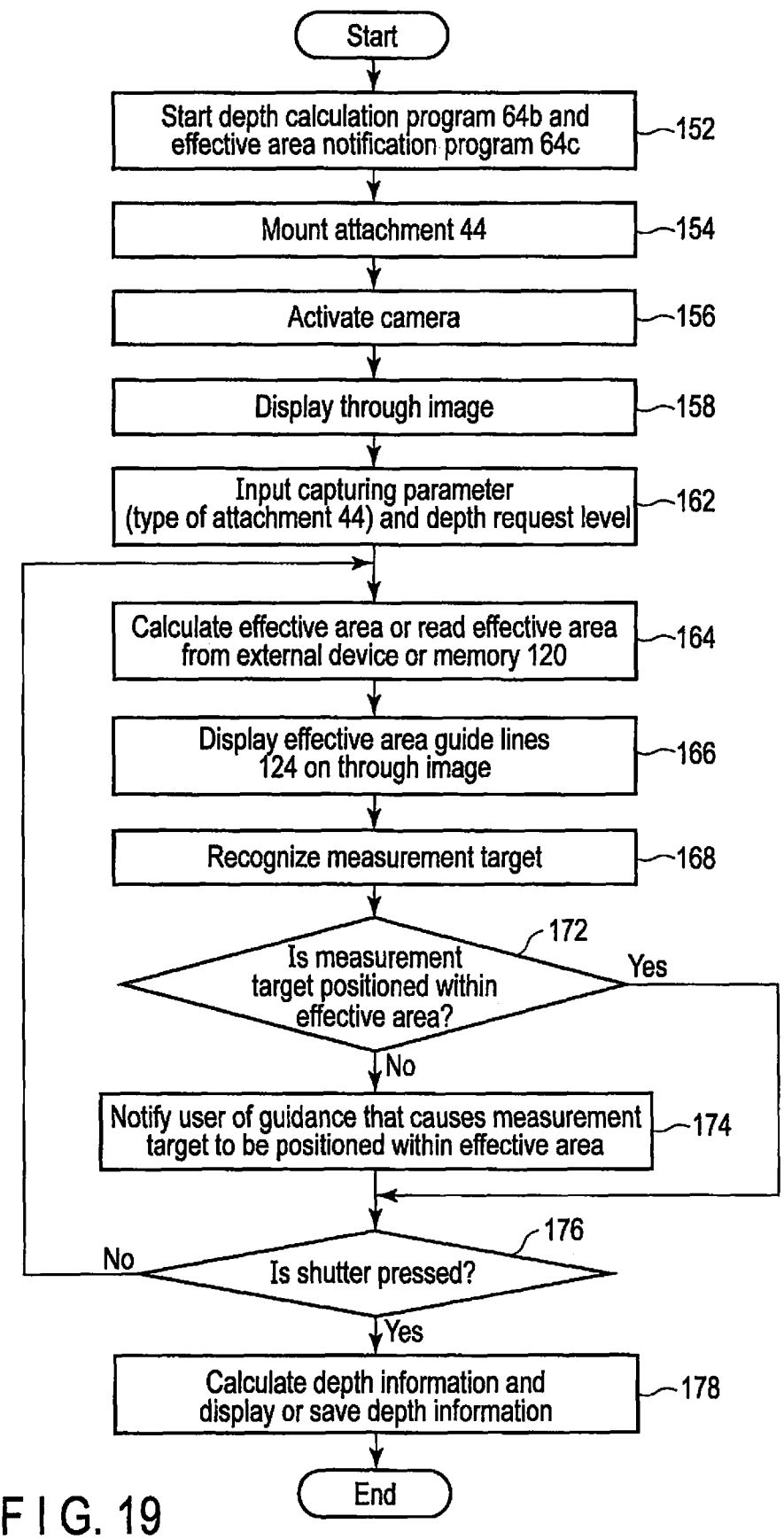
FIG. 19 is a flowchart illustrating an example of effective area notification according to the first embodiment.

FIG. 19 is a flowchart illustrating an example of notification of information in accordance with the reliability according to the first embodiment. In Block 152, the user starts the depth calculation program 64b and the effective area notification program 64c. In Block 154, the user mounts the attachment 44 to the front face of the lens 42 of the smart phone 40. When the measurement target for which the depth information is to be obtained is the object whose edge direction is vertical direction as illustrated in FIG. 18, the user adjusts the direction of the attachment 44 such that the marker 46a of the first lens barrel 46 matches the LED 40a of the smart phone 40, and adjusts the direction of the second lens barrel 48 such that the marker 48a of the second lens barrel 48 is aligned with the marker 46a. When the edge direction of the measurement target is the horizontal direction, the user adjusts the direction of the attachment 44 such that the marker 46a of the first lens barrel 46 matches the LED 40a of the smart phone 40, and then, adjusts the direction of the second lens barrel 48 such that the marker 48a of the second lens barrel 48 is shifted from the marker 46a by 90 degrees.

In Block 156, the user starts a camera application program (stored in the nonvolatile memory 64 although not illustrated) to activate a camera. When the camera application program is started, the display 60 displays a through image output from the image sensor 54 in Block 158.

In Block 162, the user inputs the capturing parameter (the type of attachment 44) using the touch pad. It is sufficient for the input of the capturing parameters to be performed before the execution of Block 164 instead of after the execution of Block 158. For example, when the depth calculation program 64b and the effective area notification program 64c are started in Block 152, a setting screen may be displayed, and capturing parameter may be input at this stage. The lens brightness, the focal length, and the size of the image sensor are values unique to the smart phone 40 and do not need to be input by the user, but these values may also be input by the user.

In Block 164, the effective area determination device 106 calculates the effective area based on the capturing parameters (and the depth request level in some cases) (in the case of FIG. 15A), reads the effective area from the effective area memory 118 (in the case of FIG. 15B), or acquires the effective area from the server 94 via the communication device 62 (in the case of FIG. 15C). In Block 166, coordinate information on right and left ends of the effective information is supplied from the effective area determination device 106 to the display 60, and the pair of guide lines 124 indicating the right and left ends of the effective area are displayed on the through image as illustrated in FIG. 18.

In Block 168, the effective area determination device 106 analyzes the image to distinguish a background and an object in the through image. The background is an area having a constant luminance value with no contrast, and the object is an area having contrast and a difference in luminance value. When recognizing the object, the effective area determination device 106 sets the object as a depth measurement target. In addition, an area that seems to be the object may be extracted by an image recognition technique or an object detection technique. The depth measurement target is not limited to being automatically recognized using image analysis, but may be selected on the touch panel by the user.

In Block 172, the effective area determination device 106 determines whether the depth measurement target is positioned within the effective area. If the depth measurement target is not positioned within the effective area (determination of NO in Block 172), the effective area determination device 106 notifies the user of capturing guidance to position the depth measurement target within the effective area in Block 174. Examples of the guidance include to display text that may change the composition such as "more rightward" and "more leftward" on the display 60 and to output an audio guide that may change the composition such as "more rightward" and "more leftward" from the audio output device 68.

During the image analysis in Block 168, the edge direction of the object may be also recognized based on the contrast, and the guidance of Block 174 may be a content that may rotate the direction of the filter 52 by 90 degrees when it is determined that the edge direction of the object is the horizontal direction, that is, the direction of the area division line of the filter 52 is in parallel to the edge direction of the object in Block 172.

Since the user is notified of such guidance, the user can reliably position the depth measurement target within the effective area, and the user performs a shutter operation after the depth measurement target is positioned within the effective area. Thus, whether a shutter has been pressed is determined in Block 176. If the shutter is not pressed, the process from Block 164 is repeated. When the shutter is pressed, it can be determined that the depth measurement target is positioned within the effective area, and the depth information is calculated for each pixel and the depth information is displayed or saved in Block 178. The depth information may be displayed and saved as a distance image in which each pixel of the image is colored in accordance with the depth information, and the depth information (numerical value) for each pixel may be displayed and saved in the form of the table corresponding to the pixel.

In addition, a captured image corresponding to the distance image is sometimes saved, but there is a case where a color shift occurs in the captured image so that it is unfavorable to view the captured image when the captured image is displayed as it is. Since a range of the color shift corresponds to the effective area, it is also possible to compensate for the color shift based on the capturing parameter for determination of the effective area to obtain a captured image with no color shift. When the reliability for each pixel has been required, it is also possible to compensate for the color shift based on the reliability for each pixel. Thus, in the case saving the captured image corresponding to distance image, the captured image may be saved after compensating for a color drift.

Regardless of the shutter operation, the calculation of the depth information may be performed for each frame of the through image in Block 164 or the like in parallel to the acquisition of the effective area. In this case, the depth measurement target of Block 168 may be recognized based on the depth information instead of being recognized based on contrast by image analysis. This is because the depth information may be obtained only up to a certain finite distance, and it may be difficult to obtain depth information of an object at infinity.

According to the first embodiment, the filter 52 that causes a different blur depending on a distance in a plurality of color components is mounted to the front face of the lens 42 of the smart phone 40. The filter 52 has at least two filter areas. Depending on an installation method of the filter 52 and a capturing parameter of an camera optical system, there is a case where light beams of a plurality of color components do not evenly pass through an end of the lens aperture, but a light beam of one color component passes more than a light beam of another color component so that an undesirable color shift (bias of color information) unnecessary for depth estimation occurs and it is difficult to accurately obtain the depth information on the entire screen. In the first embodiment, the user is notified of the effective area that enables the depth information to be accurately obtained. In addition, when the measurement target is not positioned within the effective area, the guidance to position the measurement target within the effective area is also notified. Thus, it is expected that capturing may be performed such that the depth information of the measurement target can be obtained with, high accuracy. According to the first embodiment, it is not necessary to customize the camera lens or remodel the commercially available camera lens, and it is possible to provide an electronic device and a notification method which can easily obtain depth information with one camera.

Other embodiments will be described hereinafter. In the following description, constituent elements corresponding to those of the first embodiment will be denoted by the same reference numerals, and the detailed description thereof will be omitted.

Second Embodiment

Figure 20A:
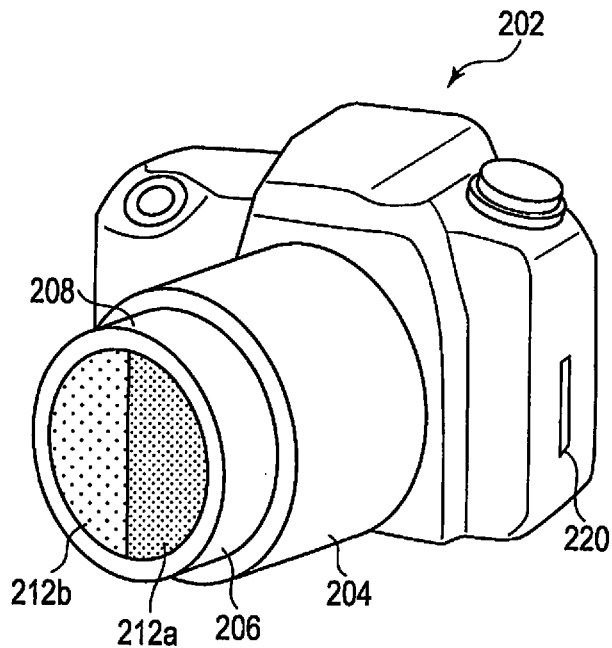
FIGS. 20A and 20B are views illustrating examples of an appearance of an electronic device according to a second embodiment.
Figure 20B:
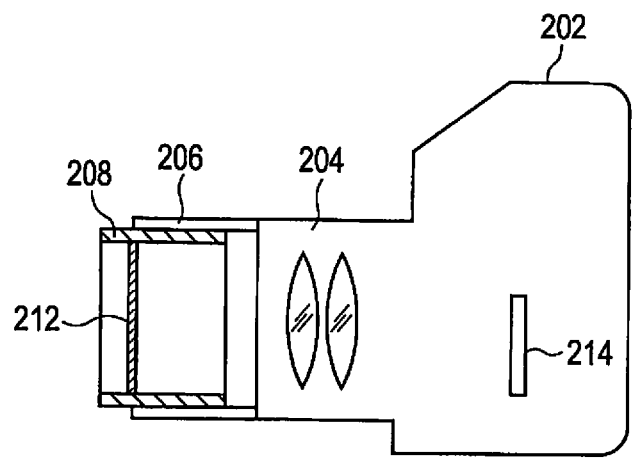

FIGS. 20A and 20B illustrate an appearance of an electronic device of a second embodiment. FIG. 20A is a perspective view, and FIG. 20B is a side view illustrating a cross-sectional structure. As the electronic device of the second embodiment, a camera 202 can be used.

A first lens barrel 206 is screwed with a screw for filter attachment at a front end of a lens 204 of the camera 202. Alternatively, the first lens barrel 206 may be attached to the front end of the lens 204 by bayonet fixing means. A second lens barrel 208 is inserted into the inner side of the first lens barrel 206. A filter 212 is arranged at a front end of the second lens barrel 208. The filter 212 is formed of a first filter area 212a for yellow and a second filter area 212b for cyan, which is similar to the filter 52 of the first embodiment. When a user applies a rotational force to the second lens barrel 208, the second lens barrel 208 is rotated with respect to the first lens barrel 206. As a result, it is possible to adjust a direction of the filter 212 (a direction of an area division line by the first filter area 212a and the second filter area 212b). If the user does not apply a rotational force, the second lens barrel 208 is stationary with respect to the first lens barrel 206. A setscrew (not illustrated) or the like may be provided in the first lens barrel 206 so as to inhibit the rotation of the second lens barrel 208 after the adjustment of the direction of the filter 212.

The second lens barrel 208 is provided on the inner side of the first lens barrel 206, but may be provided on the outer side of the first lens barrel 206.

In addition, when an edge direction of an object is a different direction from the area division line of the filter 212, the camera 202 may be directly rotated such that the direction of the area division line is aligned with the edge direction. In this case, the second lens barrel 208 is unnecessary since it is sufficient for the filter 212 not to be rotatable, and the filter 212 may be provided in the first lens barrel 206.

An electrical configuration of the camera 202 is substantially the same as the example of the electrical configuration of the smart phone 40 of the first embodiment. The electrical configuration of the camera 202 is different from that of FIG. 7 in terms that the depth calculation program 64b and the effective area notification program 64c are not installed. The depth calculation program and the effective area notification program may be provided in a second device.

The second device may be the server 94 as illustrated in FIG. 7 or a personal computer possessed by an owner of the camera 202. FIG. 21 illustrates an example of cooperation between a personal computer 230 including the depth calculation program and the effective area notification program, and the camera 202. A captured image (still image) of the camera 202 is saved in a memory card 222 inserted in a memory card slot 220 of the camera 202. The memory card 222 taken out of the memory card slot 220 is inserted into a memory card slot 232 of the personal computer 230. The personal computer 230 reads an image from the memory card 222 inserted in the memory card slot 232. As a result, an image captured by an image sensor 214 of the camera 202 is sent to the personal computer 230. When the camera 202 has a communication function, there is no need to go through the memory card 222 and the image captured by the image sensor 214 of the camera 202 is communicated to the personal computer 230.

The personal computer 230 performs depth calculation and effective area notification processing in the same manner as those of the smart phone 40 of the first embodiment.

Figure 22:
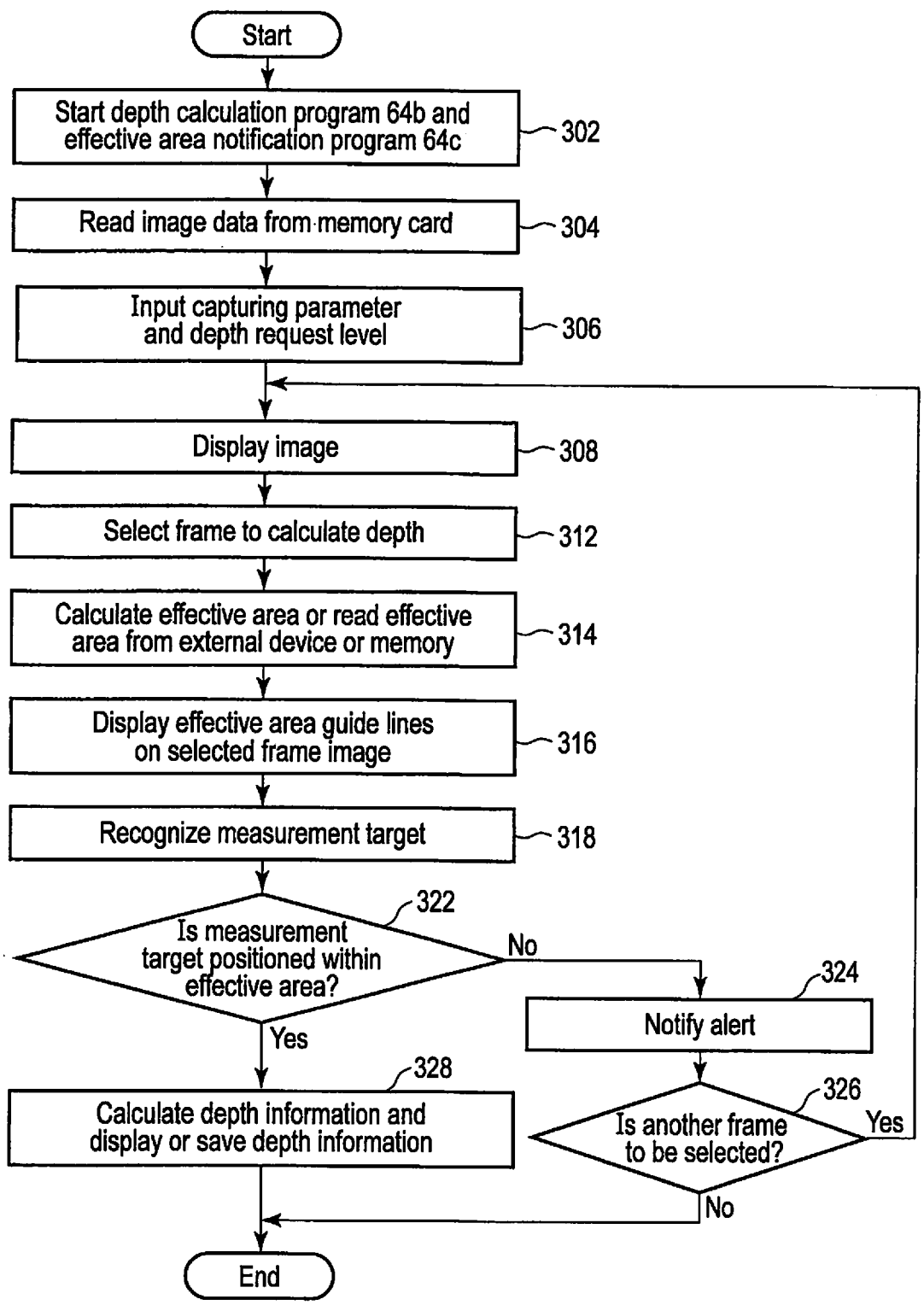
FIG. 22 is a flowchart illustrating an example of effective area notification by the system including the electronic device according to the second embodiment.

FIG. 22 is a flowchart illustrating an example of notification of information in accordance with reliability according to the second embodiment. It is assumed that the flowchart of FIG. 22 is started in a state where the memory card 222 in which the captured image of the camera 202 has been saved is inserted into the memory card slot 232 of the personal computer 230.

In Block 302, the user starts the depth calculation program and the effective area notification program on the personal computer 230. In Block 304, the personal computer 230 reads an image from the memory card 222.

In Block 306, the user inputs a capturing parameter and a depth request level. There is also a case where it is not necessary to input the depth request level. Further, when the camera 202 has a function of recording the capturing parameter together with an image, the capturing parameter and the image are read into the personal computer 230, and thus, do not need to be input by the user.

In Block 308, the personal computer 230 displays the image. A list of images of several frames may be displayed or may be displayed by being switched frame by frame. In Block 312, the user selects an image frame to be subjected to depth calculation.

In Block 314, the personal computer 230 determines an effective area by the effective area notification program. The personal computer 230 may calculate the effective area based on a capturing parameter, may read effective area information from an effective area memory of the personal computer 230 based on the capturing parameter, or may acquire effective area information from another device, for example, the server 94 via a communication device, which is similar to the first embodiment.

In Block 316, the personal computer 230 displays the selected frame image on a display 236 and displays a pair of guide lines 124 indicating right and left ends of the effective area as illustrated in FIG. 18, which is similar to the first embodiment.

In Block 318, the personal computer 230 distinguishes a background, which is an area having a constant luminance value with no contrast, and an object, which is an area having contrast and a difference in luminance value by image analysis, and recognizes the object as a depth measurement target. The depth measurement target may be selected on a touch panel by the user instead of being recognized based on the contrast by the image analysis.

In Block 322, the personal computer 230 determines whether the depth measurement target is positioned within the effective area. If the depth measurement target is not positioned within the effective area (determination of NO in Block 312), an alert indicating that it is difficult to measure the depth information for the frame is notified in Block 324. The alert may be used to select another frame or prompt re-capturing. The alert may be displayed on the display 236 or may be output as a sound from an audio output device (not illustrated). Further, the alert may be saved in association with the frame image. In this manner, when selecting the frame for which the depth information is to be calculated in Block 312, it is possible to eliminate waste of selecting again the frame for which it has been once determined that the measurement target is positioned outside the effective area. In addition, any of outsides of the effective area which the depth measurement target is positioned is also saved together with the image as alert information, it is possible to perform guidance at the time of determining the composition by displaying a frame in which the alert is stored on the camera 202 and outputting the alert at the time of re-capturing.

Thereafter, the personal computer 230 determines whether another frame it to be selected in Block 326. If the other frame is not to be selected, the operation is ended.

When the other frame is to be selected, the personal computer 230 executes again the processing of Block 308 and the subsequent blocks.

When the depth measurement target is positioned within the effective area (determination of YES in Block 322), the personal computer 230 calculates depth information for each pixel by the depth calculation program and displays or saves the depth information in Block 328. The depth information may be a distance image obtained by coloring each pixel of the image in accordance with the depth information, or the depth information (numerical value) for each pixel may be displayed and saved in the form of the table corresponding to the pixel.

According to the second embodiment, there is an effect that it is unnecessary to install the depth calculation program and the effective area notification program on the camera 202 which is the electronic device, in addition to the effects of the first embodiment. It is sufficient to provide these programs in the second electronic device to which the image of the camera is to be transferred, for example, the server or the personal computer, and it is possible to perform the depth calculation and the effective area notification at a higher speed than the case of processing with individual cameras.

Application Example

Next, an application example of an electronic device that obtains depth information will be described.

The electronic device according to the embodiment can be applied to a monitoring system that detects an intruder into a space captured by a camera and issues an alert. In the monitoring system, for example, flow of people and cars in shops, parking lots, and the like is grasped and intrusion of a person into a specific area is monitored. In addition, if movement of a person in front of an automatic door is detected, the door may be opened.

The electronic device of the embodiment can also be applied to a moving object control system. In this system, an image in a traveling direction of a moving object is imaged and acceleration, deceleration, stop, collision avoidance, direction change, and activation of safety devices such as air bag, and the like are controlled. The moving object includes, for example, an autonomously moving robot such as an automated guided vehicle, a cleaning robot, and a communication robot, a vehicle including an automobile, a flying object such as a drone and an airplane, and a ship. This system also includes a so-called front camera imaging the front of an automobile, and a so-called rear camera imaging the rear when the automobile moves backward. Further, a camera may be installed at a front end of a stationary robot arm or the like so as to control gripping of an object by the robot arm.

In the case of being applied to the drone, an inspection target is captured by the camera when inspecting a crack or breakage of an electric wire from the sky, a distance to the inspection target is detected, or it is determined whether the inspection target is on the front focus side or the back focus side as compared to an in-focus distance. Based on such a detection result or determination result, a thrust of the drone is controlled such that the distance to the inspection target becomes constant. As a result, it is possible to cause the drone to fly in parallel to the inspection target.

In addition, during the flight of the drone, the camera captures a ground direction, a height from the ground to the drone is detected, or it is determined whether the height from the ground is lower than or higher than a reference height. Based on such a detection result or determination result, a thrust of the drone is controlled such that the height from the ground becomes a designated height. As a result, it is possible to make the drone fly at the designated height.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:

one or more processors configured to obtain an image captured by a camera comprising a lens, a sensor, and a filter, the filter having a first area transmitting light of a first wavelength range and a second area transmitting light of a second wavelength range, the first wavelength range related to a first color, the second wavelength range related to a second color, the filter arranged outside the lens, the sensor capturing a first color-component image based on the light of the first wavelength range transmitted through the first area and a second color-component image based on the light of the second wavelength range transmitted through the second area, determine a color shift in the first color-component image and the second color-component image;

determine an effective area on the image for calculation of depth information based on the color shift, such that the reliability of the depth information within the effective area is higher than a reference reliability; and notify a user of the effective area.

2. The electronic device according to claim 1, wherein the first wavelength range is further related to a third color;

the second wavelength range is further related to the third color;

the sensor further captures a third-color component image based on the light of the first wavelength range transmitted through the first area and the light of the second wavelength range transmitted through the second area; and the depth information is obtained based on a shape of a blur of the first color-component image, a shape of a blur of the second color-component image, and a shape of a blur of the third color-component image.

3. The electronic device according to claim 1, wherein the one or more processors are configured to acquire or calculate the effective area based on at least one capturing parameter among plural capturing parameters.

4. The electronic device according to claim 3, wherein the one or more processors are configured to transmit an effective area acquisition request including the at least one capturing parameter to an external device, and receive the effective area corresponding to the at least one capturing parameter from the external device.

5. The electronic device according to claim 3, further comprising:
a memory that stores the effective area obtained from a result of simulation of an optical characteristic distribution of the camera based on the at least one capturing parameter.

6. The electronic device according to claim 3, wherein the plural capturing parameters comprise a distance between an aperture of the lens and the filter, a sensor size of the camera, a focal length of the lens, or a brightness of the lens.

7. The electronic device according to claim 4, wherein the plural capturing parameters comprise a distance between an aperture of the lens and the filter, a sensor size of the camera, a focal length of the lens, or a brightness of the lens.

8. The electronic device according to claim 5, wherein the plural capturing parameters comprise a distance between an aperture of the lens and the filter, a sensor size of the camera, a focal length of the lens, or a brightness of the lens.

9. The electronic device according to claim 1, wherein the filter is arranged at a front end of the lens or to be closer to an object than the front end, or is arranged at a rear end of the lens or to be closer to an image sensor than the rear end.

10. The electronic device according to claim 9, wherein when an object for which depth information in the image is to be obtained is designated, the one or more processors are configured to detect a direction of an edge component of the object and notify information corresponding to a detected direction of the edge component.

11. The electronic device according to claim 2, wherein the filter is arranged at a front end of the lens or to be closer to an object than the front end, or is arranged at a rear end of the lens or to be closer to an image sensor than the rear end.

12. The electronic device according to claim 3, wherein the filter is arranged at a front end of the lens or to be closer to an object than the front end, or is arranged at a rear end of the lens or to be closer to an image sensor than the rear end.

13. The electronic device according to claim 1, wherein the one or more processors are configured to extract an object within the effective area from among objects in the image obtained by the one or more processors, and display an extracted object within the effective area.

14. The electronic device according to claim 1, wherein the one or more processors are configured to notify guidance for capturing such that a measurement target for which depth information in the image is to be obtained is positioned within the effective area using at least any of a voice, text, or an image.

15. The electronic device according to claim 1, wherein the one or more processors are configured to specify a measurement target for which depth information in the image is to be obtained by any of a user operation, a distribution of depth information within the effective area, or object recognition from the image.

16. The electronic device according to claim 1, wherein the one or more processors are configured to notify a guidance to recommend re-capturing when determining that a measurement target for which depth information in the image is to be obtained is not within the effective area.

17. The electronic device according to claim 1, wherein the one or more processors are configured to display a guidance of the effective area on the image using at least any of a color, brightness, or contrast.

18. The electronic device according to claim 1, further comprising:
a display device that displays the image obtained by the one or more processors,
wherein the one or more processors are configured to correct the color shift of the image in accordance with the effective area, and
the display device displays the image in which the color shift is corrected.

19. The electronic device according to claim 1, further comprising:
a display device that displays the image obtained by the one or more processors with at least one of the effective area or reliability information relating to the reliability of the depth estimation used to obtain the effective area.

20. A notification method comprising:
inputting an image captured by a camera comprising a lens, a sensor, and a filter, the filter having a first area transmitting light of a first wavelength range and a second area transmitting light of a second wavelength range, the first wavelength range related to a first color, the second wavelength range related to a second color, the filter arranged outside the lens, the sensor capturing a first color-component image based on the light of the first wavelength range transmitted through the first area and a second color-component image based on the light of the second wavelength range transmitted through the second area;
determining a color shift in the first color-component image and the second color-component image;
determining an effective area on the image for calculation of depth information based on the color shift, such that the reliability of the depth information within the effective area is higher than a reference reliability; and
notifying a user of the effective area.

* * * * *